United States Patent
Minato et al.

(10) Patent No.: US 8,276,935 B2
(45) Date of Patent: Oct. 2, 2012

(54) FOLDABLE STROLLER

(75) Inventors: Raymond J. Minato, Toronto (CA);
Yunzhen Larry Zhou, Markham, CA (US)

(73) Assignee: Clek Inc., Toronto, Ontario (CA)

( * ) Notice: Subject to any disclaimer, the term of this patent is extended or adjusted under 35 U.S.C. 154(b) by 0 days.

(21) Appl. No.: 13/209,185

(22) Filed: Aug. 12, 2011

(65) Prior Publication Data

US 2011/0298198 A1    Dec. 8, 2011

Related U.S. Application Data

(63) Continuation of application No. 13/201,412, filed as application No. PCT/CA2010/000199 on Feb. 12, 2010.

(60) Provisional application No. 61/152,078, filed on Feb. 12, 2009.

(51) Int. Cl.
*B62B 7/06* (2006.01)
(52) U.S. Cl. ...... 280/647; 280/648; 280/658; 280/47.38
(58) Field of Classification Search .................. 280/638, 280/639, 642, 643, 647, 648, 650, 657, 658, 280/33.991, 33.992, 33.993, 47.38, 47.4, 280/30; 403/1
See application file for complete search history.

(56) References Cited

U.S. PATENT DOCUMENTS

| | | | |
|---|---|---|---|
| 4,805,938 A | 2/1989 | Redmond et al. | |
| 5,522,121 A | 6/1996 | Fraynd et al. | |
| 5,918,892 A | 7/1999 | Aaron et al. | |
| 6,527,294 B1 | 3/2003 | Brewington et al. | |
| 6,601,866 B1 * | 8/2003 | Dobies | 280/304.1 |
| 6,752,405 B1 | 6/2004 | Wright | |
| 7,516,966 B2 * | 4/2009 | Gray | 280/47.38 |
| 7,896,384 B2 * | 3/2011 | Schonfeld | 280/647 |
| 2006/0071451 A1 | 4/2006 | Cheng | |
| 2008/0179863 A1 | 7/2008 | Schonfeld | |
| 2010/0044984 A1 * | 2/2010 | Cohen et al. | 280/47.38 |
| 2010/0259021 A1 * | 10/2010 | Ahnert et al. | 280/47.4 |

FOREIGN PATENT DOCUMENTS

| | | |
|---|---|---|
| GB | 2373484 A | 9/2002 |
| GB | 2413311 A | 10/2005 |

* cited by examiner

*Primary Examiner* — Isam Alsomiri
*Assistant Examiner* — Brian Swenson
(74) *Attorney, Agent, or Firm* — Heenan Blaikie LLP

(57) ABSTRACT

A stroller includes laterally spaced apart hubs that interconnect upper, middle and front frame member assemblies of a chassis of the stroller. The hubs are disposed one each along opposite sides of the stroller, and include mounting structures for coupling two or more of the strollers together in a side-by-side fashion. The hubs further include other mounting structures for mounting a seat assembly to the stroller chassis and for supporting both rearward facing and frontward facing orientation of the seat assembly as well as selectable inclination positions. Each of the hubs includes a folding mechanism for supporting folding of the stroller, such as for transport in a vehicle or for storage. Other laterally spaced apart hubs are provided along the upper frame members for providing a second point of attachment between two coupled strollers and for mounting of accessories.

20 Claims, 28 Drawing Sheets

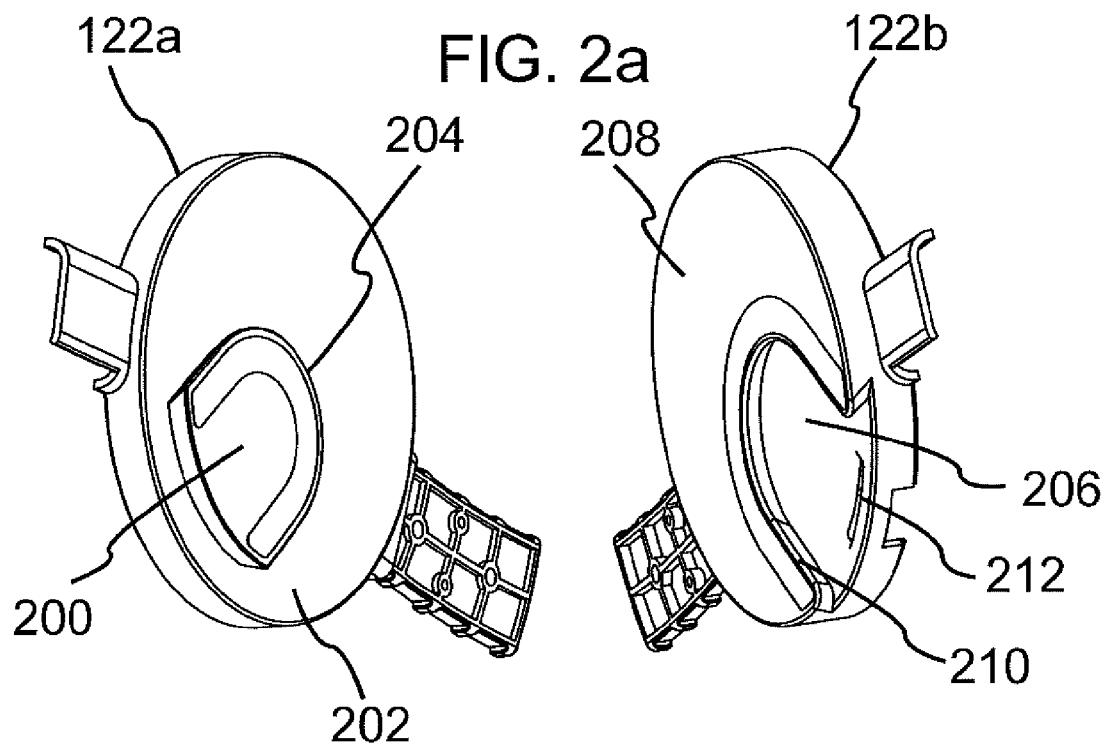
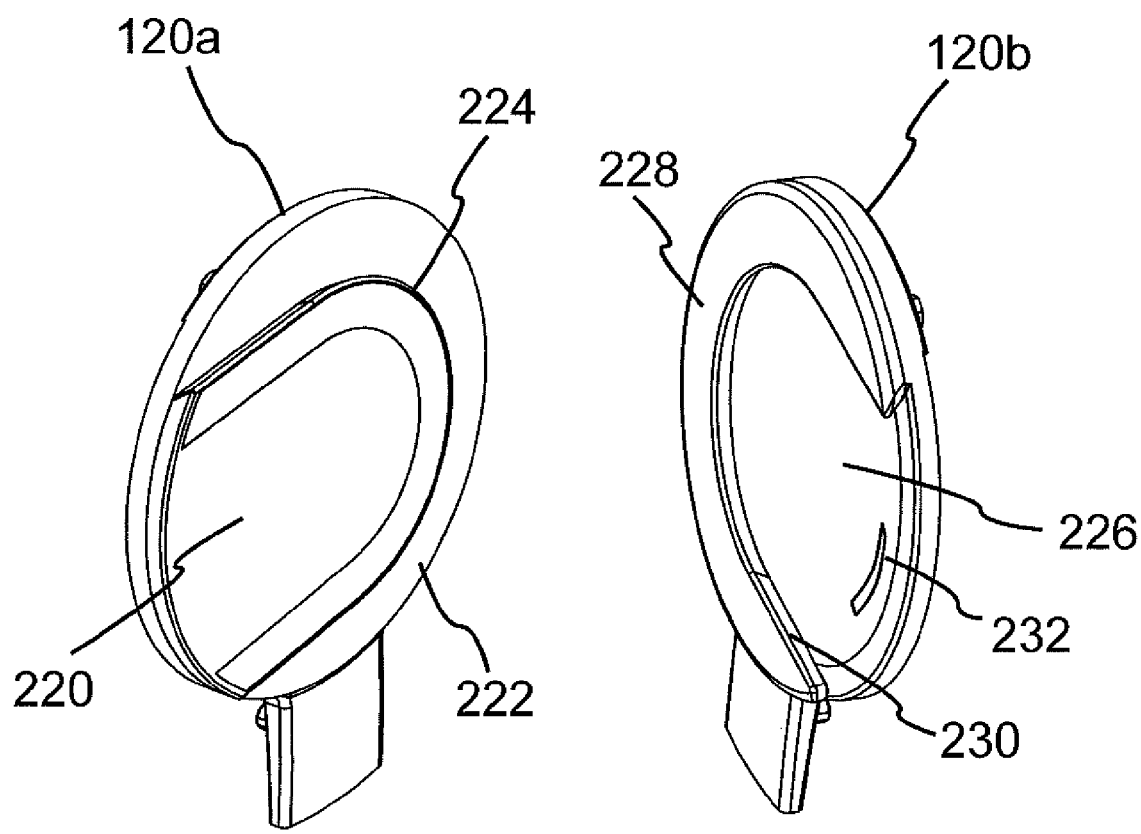

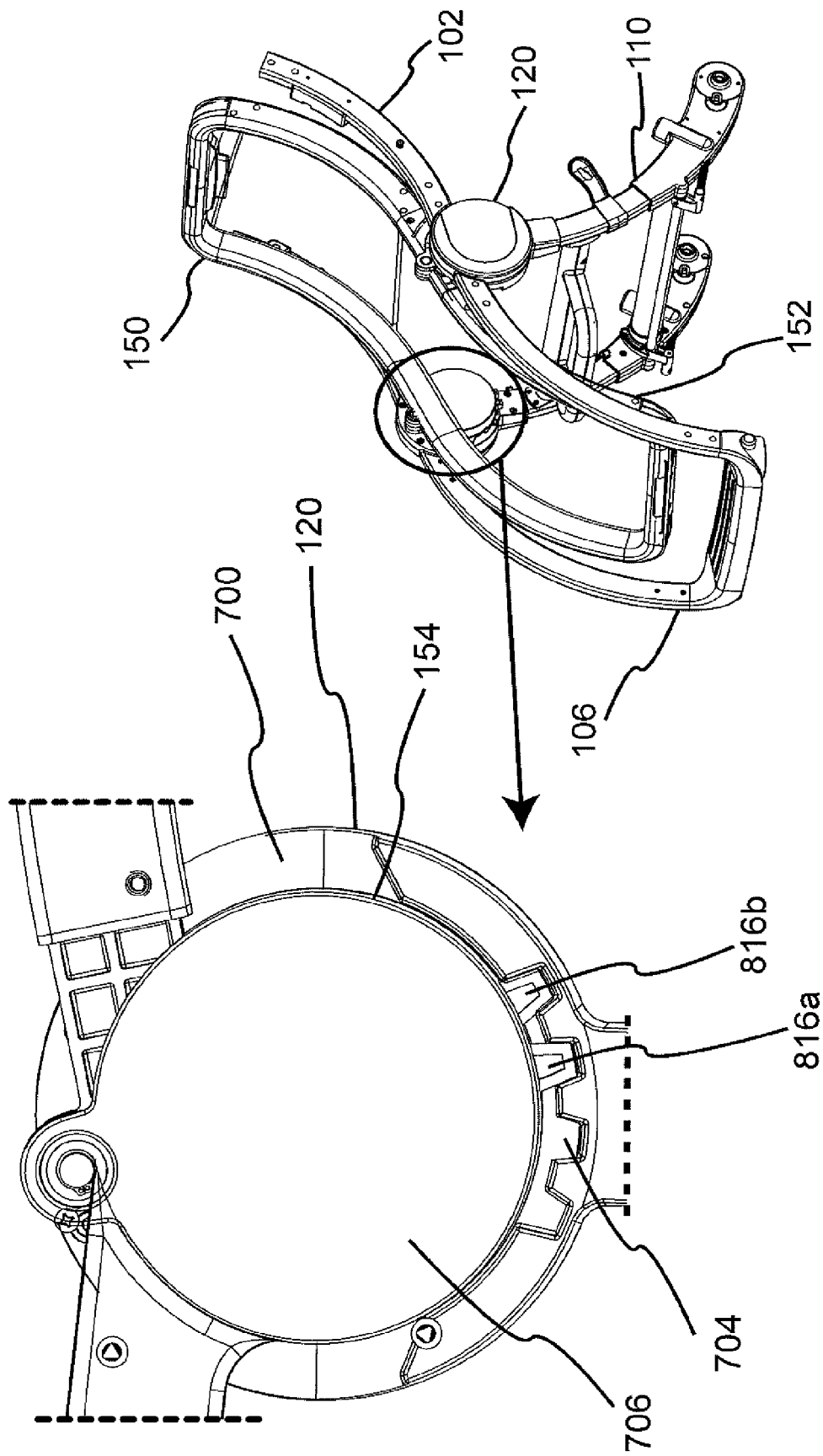

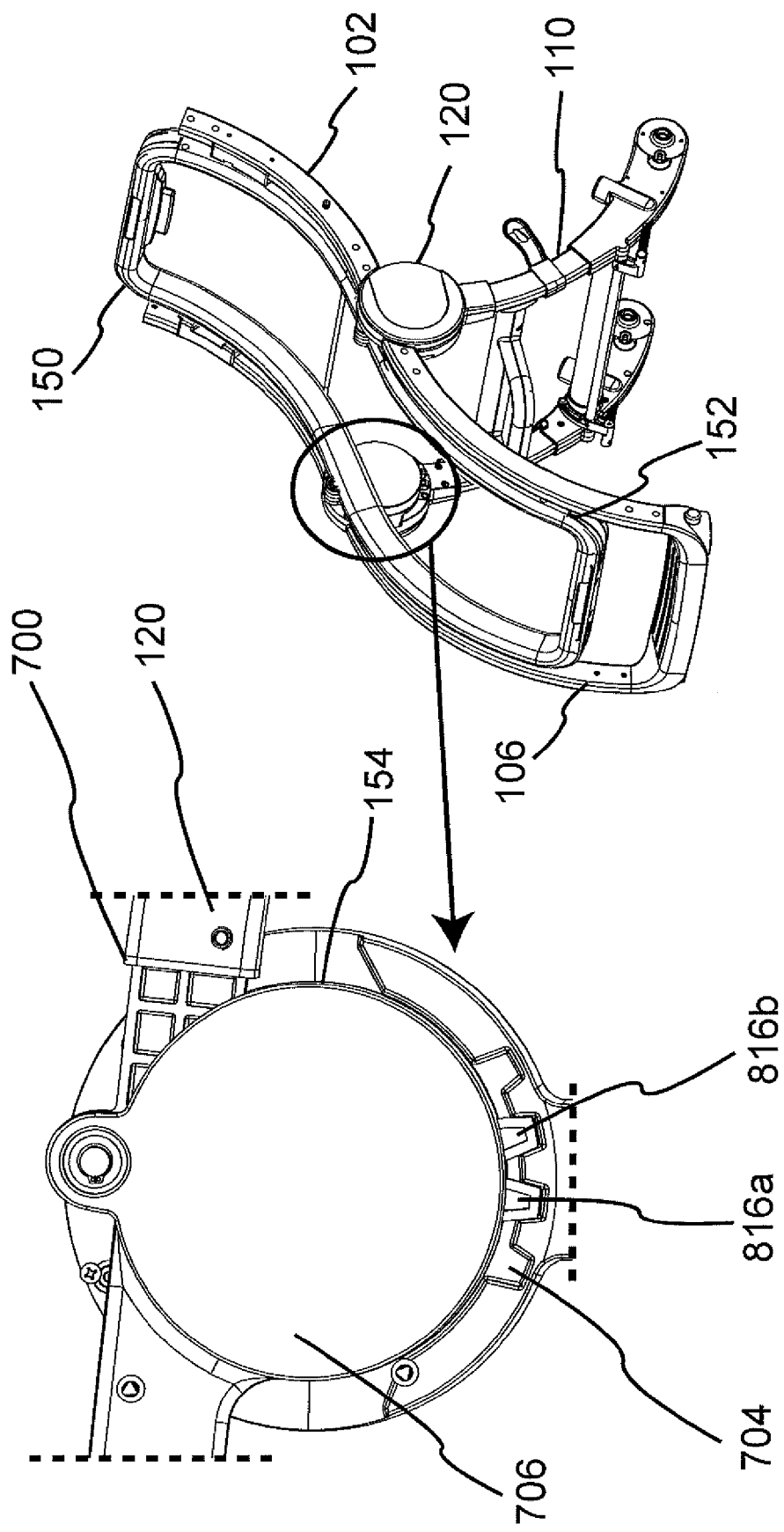

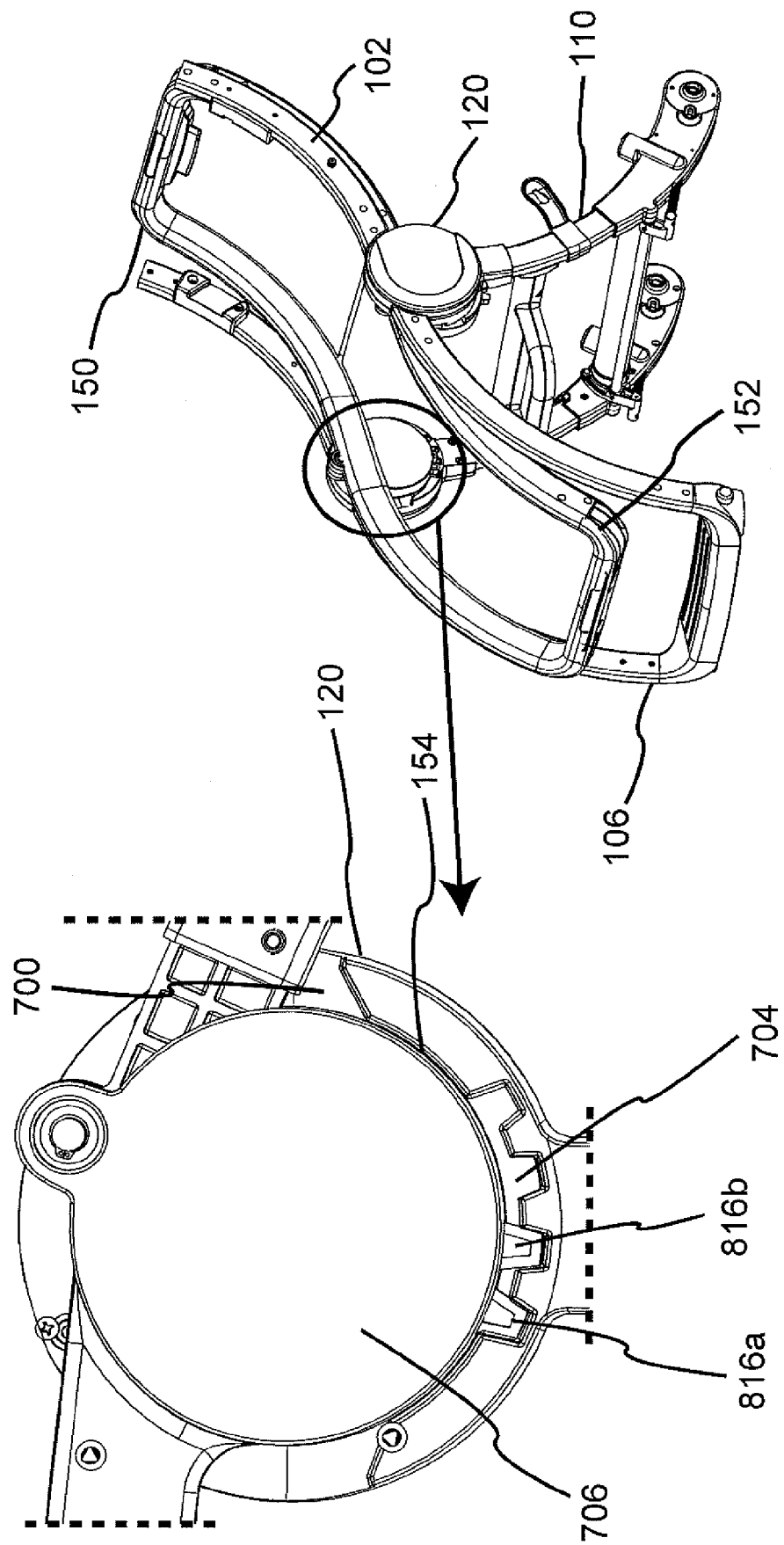

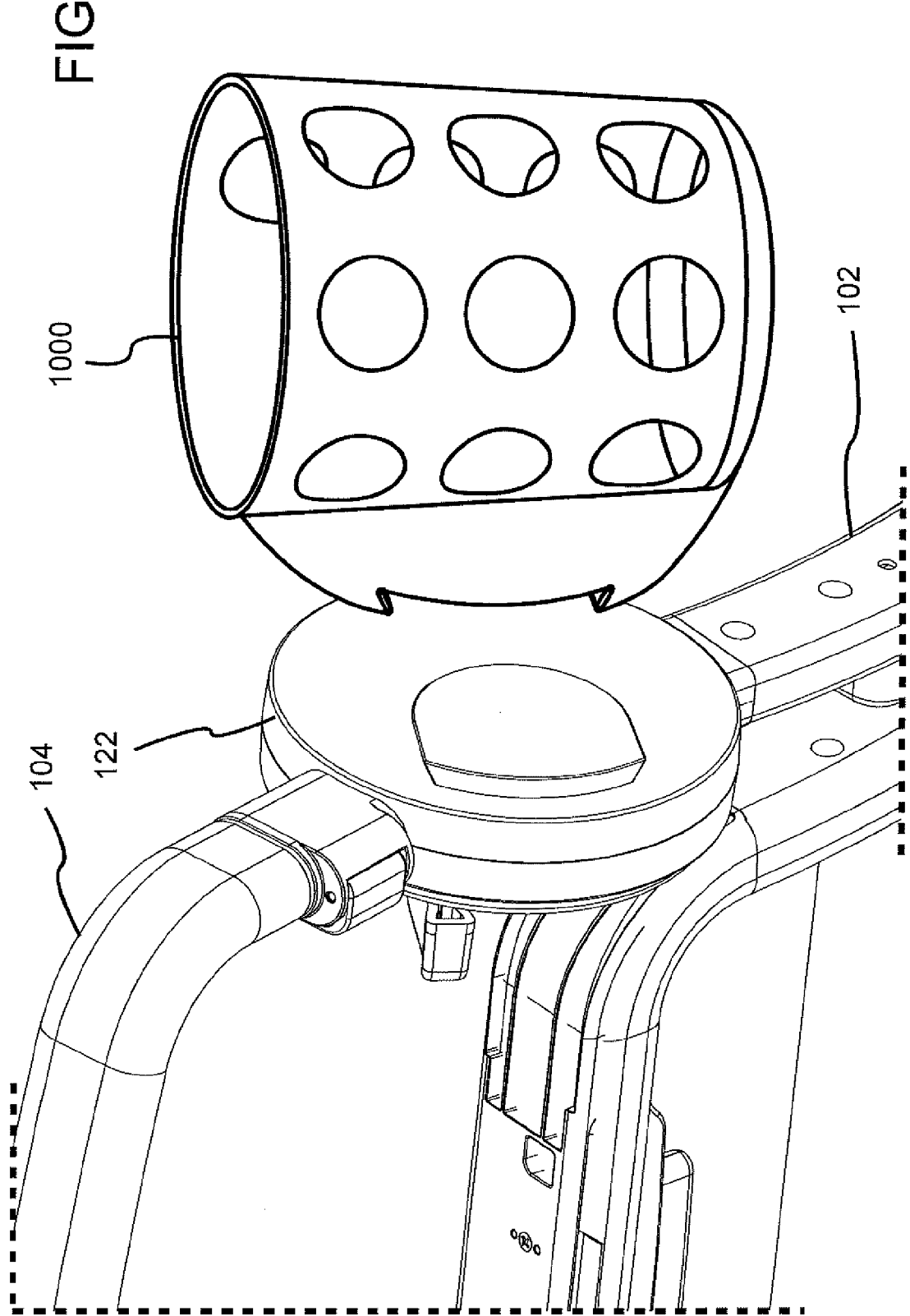

FOLDABLE STROLLER

This application is a continuation of U.S. patent application Ser. No. 13/201,412 filed on Aug. 12, 2011, which is a National Phase Application of PCT/CA2010/000199 filed on Feb. 12, 2010, which claims the benefit under 35 U.S.C. 119(e) of U.S. Provisional Patent Application No. 61/152,078 filed on Feb. 12, 2009. The instant application incorporates by reference U.S. patent application Ser. No. 13/201,412, in its entirety.

FIELD OF THE INVENTION

The instant invention relates generally to foldable strollers, and more particularly to foldable strollers that may be used separately to transport a single occupant, or that may be coupled together to transport multiple occupants.

BACKGROUND OF THE INVENTION

Families with small children tend to acquire a wide variety of specialized equipment for transporting their children from place to place. In particular, car seats are required for transporting children in vehicles over long distances or during inclement weather, and strollers are required for transporting children locally over shorter distances. Often, a stroller is carried to a destination in the back of a vehicle. Upon arriving at the destination, the children are transferred out of the vehicle and into the stroller. It is therefore common that strollers are designed to be collapsible or foldable so as to fit easily within the trunk of a vehicle, or for transport on public transit or aircraft, etc.

Multiple-child strollers, such as for instance double or triple strollers, are known for transporting more than one child at a time. One type of multiple-child stroller provides two or more seating areas in a permanent side-by-side or tandem arrangement. Of course, such strollers do not permit children to be moved along separate paths and cannot be separated if only single child transport is desired. In view of these limitations, a family often resorts to purchasing a multiple-child stroller for transporting more than one child at a time, as well as a single stroller for those times when only single child transport is desired. Such families not only incur additional expense, but must also store a plurality of strollers and must dispose of the multiple-child stroller, and then eventually the single stroller, as the children age.

Another type of multiple-child stroller is based on separable, individual strollers that can be coupled together to form a side-by-side unit, and that can be decoupled when single child transport is desired. Examples of such tandem coupling approaches are disclosed in U.S. Pat. Pub. No. 2008/0179863 to Schonfeld, U.S. Pat. No. 4,805,938 to Redmond et al. and U.S. Pat. No. 5,522,121 to Fraynd et al. These coupling systems for joining two strollers have used elongated releasable clamps or other elongated connectors to couple the strollers. The resulting width of such designs generally is greater than standard door widths, limiting the utility thereof. Moreover, the clamping devices are bulky and not conveniently stored during separate operation of the strollers, and/or separate storage of detached wheels is required when the strollers are operated in a coupled-together mode. In addition, the system that is disclosed by Schonfeld requires the rear wheels of each stroller to be spaced relatively closely together, so that when the individual strollers are coupled together the inside rear wheel of one stroller does not interfere with the inside rear wheel of the other stroller. Although the strollers are likely to be stable when coupled together, they are also likely to be far less stable, and therefore subject to tipping, when used separately. In particular, the relatively closely spaced rear wheels of the stroller are located below the center of weight of the child and close to the handle. The front stroller wheels, which are more widely spaced apart than the rear wheels, are not likely to provide sufficient stabilization when the stroller is being pushed over uneven or soft ground surfaces, since the front wheels of a stroller often come out of contact with the ground surface under these conditions.

UK Patent Application GB 2,413,311 to Naseby describes a system whereby two strollers may be closely coupled together to form a side-by-side double stroller. In particular, the front and rear wheels and the handle along one side of a first stroller are removed, and the resulting exposed stubs are inserted into corresponding brackets along one side of a second stroller, so as to couple the two strollers together. Although this system reduces the overall width of the coupled strollers compared to the above-mentioned systems, it also requires separate storage of detached parts and the coupling/decoupling procedure is awkward. The stroller that is disclosed by Naseby is better suited to being used either as a single stroller or as a double stroller for prolonged periods of time, since rapid conversion between coupled and decoupled conditions is hindered by the need to remove, store and reattach multiple stroller parts.

UK Patent Application GB 2,373,484 to Sear et al. discloses yet another system whereby two strollers may be closely coupled together to form a side-by-side double stroller. In particular, to connect two strollers together one side of each stroller is equipped with a rail extending from the front to the rear of the stroller. The shapes of the respective rails are such that one rail mates and interlocks with the other rail. To attach the two strollers together requires the user to unlock the front and rear wheels of one of the strollers, retract them and lock them in the retracted position, to align the rails of each stroller, and then to hold one stroller still whilst pushing the other stroller backwards until the two are locked together. In addition to being awkward to use, the rails extending from the front to the rear of the stroller prevent the stroller from being folded for storage or transport. Further, the rail system employed by Sear et al. is prone to fouling by pebbles, sand and other debris that may be kicked up into the rails due to their close proximity to the wheels and ground surface.

Of course, in addition to simply providing a suitable structure for coupling two strollers together, it is also necessary to consider a variety of other factors relating to safety and convenience of use. In particular, prior art brake systems for strollers may prove to be inadequate or unworkable when two individual strollers are coupled together to form a unitary structure. For instance, removing or relocating parts of the strollers in order to couple them together may prevent a prior art brake system from operating properly. In addition, the brake mechanism of either stroller should be sufficiently strong to prevent both strollers from moving when coupled together, and should engage reliably.

Another notable shortcoming of the prior art multi-child strollers is the lack of adaptable seating systems. In particular, the prior art strollers provide two seats that are suitable for toddler age children, but lack suitable seating to accommodate newborn children and pre-toddlers. Thus, families with a toddler and a newborn may still need to purchase a separate stroller in order to safely accommodate the newborn. Of course, even when both children can be accommodated in one of the prior art multi-child strollers, still the ability to adjust the orientation and/or the inclination of the seats is limited.

It would be advantageous to provide a stroller system that overcomes at least some of the above-mentioned limitations of the prior art.

SUMMARY OF EMBODIMENTS OF THE INVENTION

In accordance with an aspect of an embodiment of the invention there is provided a foldable stroller, comprising: left and right front wheels; left and right side laterally spaced-apart front frame members, each of the left and right side front frame members having a forward end portion and a rearward end portion, the forward end portion of the left side front frame member being coupled to the left front wheel and the forward end portion of the right side front frame member being coupled to the right front wheel, the left and right side front frame members being rotatable as a unit; left and right rear wheels; left and right side laterally spaced-apart middle frame members, each of the left and right side middle frame members having a forward end portion and a rearward end portion, the rearward end portion of the left side middle frame member being coupled to the left rear wheel and the rearward end portion of the right side middle frame member being coupled to the right rear wheel, the left and right side middle frame members being rotatable as a unit; left and right side laterally spaced-apart upper frame members, each of the left and right side upper frame members having a forward end portion and a rearward end portion, the left and right side upper frame members being rotatable as a unit; and, left and right side laterally spaced apart folding assemblies each comprising a housing supported by the forward end portion of a corresponding one of the left and right middle frame members, each of the left and right side folding assemblies having disposed within the housing a first rotatable member and a second rotatable member rotatably coupled to a pivot member for rotation about a common axis of rotation, the first rotatable member and the second rotatable member coupled together via a linkage assembly comprising a first linkage arm having a first end pivotally attached to the first rotatable member and a second linkage arm having a first end pivotally attached to the second rotatable member, the linkage assembly further comprising a linkage pin linking together a second end of the first linkage arm that is opposite the first end thereof and a second end of the second linkage arm that is opposite the first end thereof, the housing of each folding assembly having an inner surface defining a guide-channel that extends generally from an edge portion of the housing along a direction toward the pivot member, the linkage pin projecting into the guide channel and being slidingly retained therein, the rearward end portion of a corresponding one of the left and right front frame members being attached to one of the first and second rotatable members and the forward end portion of a corresponding one of the left and right upper frame members being attached to the other one of the first and second rotatable members, wherein the linkage pin slidingly travels within the guide-channel such that the first rotatable member and the second rotatable member rotate relative to each other in a synchronized fashion when the foldable stroller is converted between a rolling configuration and a folded configuration.

In accordance with an aspect of an embodiment of the invention there is provided a folding assembly for a stroller frame having a front frame member, a middle frame member and an upper frame member, comprising: a pivot member; a first rotatable member; a second rotatable member, the first and second rotatable members being rotationally coupled to the pivot member to rotate about a common axis of rotation; a linkage assembly comprising a first linkage arm having a first end pivotally attached to the first rotatable member and a second linkage arm having a first end pivotally attached to the second rotatable member, the linkage assembly further comprising a linkage pin connecting together a second end of the first linkage arm that is opposite the first end thereof and a second end of the second linkage arm that is opposite the first end thereof; and, a housing for containing the pivot member, the first and second rotatable members, and the linkage assembly, the housing having an inner surface defining a guide-channel that extends generally from an edge portion of the housing along a direction toward the pivot member, the linkage pin projecting into the guide-channel and being slidingly retained therein, wherein the linkage pin slidingly travels within the guide-channel for guiding the first rotatable member and the second rotatable member to rotate relative to each other in a synchronized fashion.

In accordance with an aspect of an embodiment of the invention there is provided a folding mechanism usable with a foldable stroller having front, middle and upper frame members, the folding mechanism comprising: first and second rotatable members rotatably mounted to rotate relative to each other, the first rotatable member being disposed for rotation in a first rotation plane and the second rotatable member being disposed for rotation in a second rotation plane that is spaced apart from and substantially parallel to the first rotation plane; a linkage assembly comprising a first linkage arm having a first end pivotally attached to the first rotatable member and a second linkage arm having a first end pivotally attached to the second rotatable member, the linkage assembly further comprising a linkage pin connecting together a second end of the first linkage arm that is opposite the first end thereof and a second end of the second linkage arm that is opposite the first end thereof; and, a housing for containing the first and second rotatable members and the linkage assembly, the housing having at least one inner surface within which a guide-channel is defined, the linkage pin projecting into the guide-channel and being slidingly retained therein, wherein the guide-channel is oriented for guiding the linkage pin along a predetermined direction of travel when the folding mechanism is actuated between a folded configuration of the foldable stroller and an unfolded configuration of the foldable stroller, so that the first rotatable member and the second rotatable member are constrained to rotate relative to each other in a synchronized fashion.

In accordance with an aspect of an embodiment of the invention there is provided a stroller, comprising: left and right front wheels; left and right side laterally spaced-apart front frame members, each of the left and right side front frame members having a forward end portion and a rearward end portion, the forward end portion of the left side front frame member being coupled to the left front wheel and the forward end portion of the right side front frame member being coupled to the right front wheel; left and right rear wheels; left and right side laterally spaced-apart middle frame members, each of the left and right side middle frame members having a forward end portion and a rearward end portion, the rearward end portion of the left side middle frame member including a wheel mounting structure along an outer face thereof and along an inner face thereof opposite the outer face, the rearward end portion of the right side middle frame member including a wheel mounting structure along an outer face thereof and along a inner face thereof opposite the outer face, so that the left rear wheel is selectably mountable adjacent to either the outer face or the inner face of the left side middle frame member, and so that the right rear wheel is selectably mountable adjacent to either the outer face or the inner face of the right side middle frame member; left and right side laterally spaced-apart upper frame members, each of the left and right side upper frame members having a forward end portion and a rearward end portion; and, left and right side laterally spaced apart hubs disposed between and interconnecting corresponding ones of the front, middle and upper frame members, the left and right side hubs having complementary halves of an interlocking mounting structure defined on outward facing surfaces thereof, wherein side-by-side coupling of two strollers is supported by interlocking one of the left and right side hubs of one of the two strollers with the other one of the left and right side hubs of the other one of the two strollers.

In accordance with an aspect of an embodiment of the invention there is provided a stroller, comprising: a front frame member assembly supporting a pair of laterally spaced apart front wheels; a middle frame member assembly supporting a pair of laterally spaced apart rear wheels, the middle frame member assembly configured so that the rear wheels are detachably mountable one each adjacent to outer faces of the middle frame member assembly for operation in a detached operating condition between a first and a second stroller, and so that the rear wheels are detachably mountable one each adjacent to inner faces of the middle frame member assembly for operation in a coupled operating condition between a first and a second stroller; an upper frame member assembly with a push handle portion; first and second laterally spaced apart hubs disposed between and interconnecting the front frame member assembly, the middle frame member assembly, and the upper frame member assembly, the first hub having a first mounting structure defined on an outward facing surface thereof and the second hub having a second mounting structure defined on an outward facing surface thereof, the second mounting structure different than the first mounting structure, the first and second mounting structures defining complementary halves of a first interlocking coupling mechanism; wherein the first mounting structure disposed on the outward facing surface of the first hub of the first stroller is aligned with and engages the second mounting structure on the outward facing surface of the second hub of the second stroller, for detachably securing the first stroller to the second stroller in a side-by-side fashion.

In accordance with an aspect of an embodiment of the invention there is provided a stroller, comprising: a front frame member assembly supporting a pair of laterally spaced apart front wheels; a middle frame member assembly supporting a pair of laterally spaced apart rear wheels, the middle frame member assembly including first and second wheel mounting structures disposed along outer faces thereof on opposite sides of the stroller and including third and fourth wheel mounting structures disposed along inner faces thereof on opposite sides of the stroller, so that the pair of rear wheels is selectably mountable adjacent to either the outer faces or the inner faces of the middle frame member, a lateral separation between the pair of rear wheels being greater when the pair of rear wheels is mounted adjacent to the outer faces of the middle frame member relative to when the pair of rear wheels is mounted adjacent to the inner faces of the middle frame member; an upper frame member assembly extending to a push handle end; a first hub disposed on a first side of the stroller and a second hub disposed on a second side of the stroller and opposite the first hub, the first and second hubs disposed between and interconnecting the front frame member assembly, the middle frame member assembly, and the upper frame member assembly, the first hub having a raised flange portion of a first interlocking coupling mechanism defined on an outward facing surface thereof and the second hub having a recessed slot portion of the first interlocking coupling mechanism defined on an outward facing surface thereof; a third hub disposed on the first side of the stroller and proximate the push handle end of the upper frame member assembly and a fourth hub disposed on the second side of the stroller and proximate the push handle end of the upper frame member assembly, the third hub having one of a raised flange portion and a recessed slot portion of a second interlocking coupling mechanism defined on an outward facing surface thereof and the fourth hub having the other one of the raised flange portion and the recessed slot portion of the second interlocking coupling mechanism defined on an outward facing surface thereof; wherein for coupling the stroller with a second stroller, the raised flange portion of the first hub on the first side of the stroller slidingly engages the recessed slot portion of the second hub on the second side of the second stroller, and the one of the raised flange portion and the recessed slot portion of the third hub on the first side of the stroller sliding engages the other one of the raised flange portion and the recessed slot portion on the fourth hub on the second side of the second stroller.

In accordance with an aspect of an embodiment of the invention there is provided a method comprising: providing a first stroller and a second stroller each comprising a frame supported by a pair of laterally spaced apart front wheels and a pair of laterally spaced apart rear wheels, the frame of each stroller comprising first and second mounting structures on a first side thereof and comprising third and fourth mounting structures on a second side thereof, the second side opposite the first side of the stroller, a maximum frame width being defined between outward facing surfaces of the first and third mounting structures, each one of the pair of laterally spaced apart rear wheels being detachably mounted adjacent to an outer face of a rear-wheel support member on opposite sides of the frame, such that a lateral separation between the rear wheels is greater than the maximum frame width; detaching each rear wheel from a respective rear-wheel support member on each one of the first stroller and the second stroller; detachably mounting each rear wheel to an inner face of a respective rear-wheel support member on opposite sides of the frame of each one of the first stroller and the second stroller, such that for each one of the first stroller and the second stroller the rear wheels are laterally spaced apart by an amount that is less than the maximum frame width of the respective stroller; and, detachably engaging the first and second mounting structures on the first side of the frame of the first stroller with the third and fourth mounting structures on the second side of the frame of the second stroller, respectively, so as to couple the first stroller with the second stroller in a side-by-side fashion with two points of attachment, wherein a maximum overall width of the first and second stroller, when coupled together in the side-by-side fashion, does not exceed the sum of the maximum frame width of the first stroller and the maximum frame width of the second stroller.

In accordance with an aspect of an embodiment of the invention there is provided a stroller, comprising: a rear wheel having a toothed hub defining a plurality of retaining grooves arranged around a circumferential direction thereof; a stroller chassis with a rear-wheel support member having a wheel-mounting structure disposed along both an inner face and an outer face thereof, so that the rear wheel is selectably mountable adjacent to either the inner face or the outer face of the rear-wheel support member, the toothed hub facing toward the rear-wheel support member when the rear wheel is mounted thereto, and the rear-wheel support member having a through-slot proximate the wheel-mounting structures; and, a brake device, comprising: a rocker arm having a first end and a second end and being pivotally mounted adjacent to one of the inner and outer faces of the rear-wheel support member and proximate to the wheel-mounting structures; a control cable having a controlling end and a pulling end, the pulling end being coupled to the first end of the rocker arm; and, an elongated linear-actuator assembly having a first end that is pivotally coupled to the second end of the rocker arm and having a second end opposite the first end, the second end comprising a lock-pin support member and a lock-pin that is mounted perpendicular to the lock-pin support member and that extends in first and second opposite directions from the lock-pin support member, one end of the lock-pin extending along the first direction through the through-slot in the rear-wheel support member for engaging one of the retaining grooves when the rear wheel and the rocker arm are mounted adjacent to different ones of the inner and outer faces of the rear-wheel support member, and the other end of the lock-pin extending along the second direction for engaging one of the retaining grooves when the rear wheel and the rocker arm are mounted adjacent to the same one of the inner and outer faces of the rear-wheel support member.

In accordance with an aspect of an embodiment of the invention there is provided a brake device for a stroller, comprising: a rocker arm having a first end and a second end and supporting a pivoting movement about a pivot point that is defined between the first end and the second end; a control cable having a controlling end and a pulling end, the pulling end being coupled to the first end of the rocker arm; and, an elongated linear-actuator assembly having an overall length and comprising: a retaining rod having a length that is less than the overall length of the elongated linear-actuator assembly, the retaining rod having a first end that is pivotally coupled to the second end of the rocker arm and having a second end with a flange extending perpendicularly from the retaining rod; a lock-pin support member having a first end and a second end that is opposite the first end, the lock-pin support member having a passageway extending therethrough between the first and second ends, a first portion of the passageway that is proximate the first end being dimensioned smaller than the retaining rod flange, and a second portion of the passageway that is proximate the second end being dimensioned larger than the retaining rod flange, a transition between the first portion of the passageway and the second portion of the passageway defining an interior bearing surface, and the second end of the retaining rod being disposed within the second portion of the passageway, when in an assembled condition, so that the retaining rod flange faces the interior bearing surface; a lock-pin for engaging a retaining groove of a rear wheel of the stroller, the lock-pin mounted perpendicularly to the lock-pin support member and proximate the second end thereof, the lock-pin extending in first and second opposite directions from the lock-pin support member; and first and second resilient members disposed between the first end of the retaining rod and the first end of the lock-pin support member, the second resilient member for driving the lock-pin into an engaged position when the control cable acts to pull the rocker arm into a braking position and thereby compress the first resilient member, and the first resilient member for retracting the lock-pin from the engaged position when the control cable acts to release the rocker arm from the braking position, wherein the lock-pin engages one of the retaining grooves of the rear wheel of the stroller when in the engaged position, the rear wheel being selectably mounted along either the first or second direction relative to the elongated linear-actuator assembly.

In accordance with an aspect of an embodiment of the invention there is provided a stroller, comprising: a rear wheel having a toothed hub defining a plurality of retaining grooves arranged around a circumferential direction thereof; a stroller chassis with a rear-wheel support member having a wheel-mounting structure disposed along both an inner face and an outer face thereof, so that the rear wheel is selectably mountable adjacent to either the inner face or the outer face of the rear-wheel support member, the toothed hub facing toward the rear-wheel support member when the rear wheel is mounted thereto, and the rear-wheel support member having a through-slot proximate the wheel-mounting structures; and, a brake system comprising a brake controller and a brake mechanism that is mounted adjacent to one of the inner face and the outer face of the rear-wheel support and proximate to the wheel-mounting structures, the brake controller in communication with the brake mechanism via a control cable, the brake controller for actuating the brake mechanism between a braking condition and a non-braking condition, the brake mechanism comprising at least one compression spring, a lock-pin support member and a retaining member responsive to the brake controller for retaining the lock-pin support member when in the non-braking condition and for releasing the lock-pin support member when in the braking condition, the brake mechanism further comprising a lock-pin mounted perpendicular to the lock-pin support member and having a first end extending away from the lock-pin support member in first direction and having a second end extending away from the lock-pin support member in a second direction that is opposite the first direction, the first end of the lock-pin extending through and protruding beyond the through-slot in the rear-wheel support member, wherein when the retaining member releases the lock-pin support member the at least one compression spring pushes the lock-pin support member so as to engage one end of the lock-pin in a retaining groove between two adjacent teeth of the toothed hub, and wherein the first end of the lock-pin engages in the retaining groove when the rear wheel and the brake mechanism are mounted to different ones of the outer face and the inner face of the rear-wheel support member, and wherein the second end of the lock-pin engages in the retaining groove when the rear wheel and the brake mechanism are both mounted to a same one of the outer face and the inner face of the rear-wheel support member.

In accordance with an aspect of an embodiment of the invention there is provided a stroller, comprising: a front frame member assembly supporting a pair of laterally spaced apart front wheels; a middle frame member assembly supporting a pair of laterally spaced apart rear wheels; an upper frame member assembly with a push handle portion; first and second laterally spaced apart hubs disposed between and interconnecting the front frame member assembly, the middle frame member assembly, and the upper frame member assembly, the first hub having a first mounting structure projecting from an inward facing surface thereof and the second hub having a second mounting structure projecting from an inward facing surface thereof, the first mounting structure comprising a first shaft extending from the first hub and the second mounting structure comprising a second shaft extending from the second hub, the first and second shafts being axially aligned one with the other, each one of the first and second shafts having two mutually parallel flat sides and two convexly curved sides joining the two mutually parallel flat sides, the two mutually parallel flat sides being separated by a first distance; and, a seat assembly comprising at least one seat frame member and first and second connector assemblies disposed one each on opposite sides of the at least one seat frame member, the first and second connector assemblies each comprising a mounting surface having a recessed slot defined therein, each recessed slot having a narrow portion disposed between two relatively wider portions, the narrow portion corresponding approximately to the first distance between the two mutually parallel sides of each of the first and second shafts, wherein the narrow portion of the recessed slot of one of the first and second connector assemblies is aligned with the two mutually parallel sides of one of the first and second shafts, and the narrow portion of the recessed slot of the other one of the first and second connector assemblies is aligned with the two mutually parallel sides of the other one of the first and second shafts, and thereafter the first and second shafts are urged from one of the two relatively wider portions of the respective recessed slot, through the narrow portion and into the other one of the two relatively wider portions for detachably mounting the seat assembly to the first and second hubs.

In accordance with an aspect of an embodiment of the invention there is provided a stroller, comprising: a stroller chassis, comprising: a front frame member assembly supporting a pair of laterally spaced apart front wheels; a middle frame member assembly supporting a pair of laterally spaced apart rear wheels; an upper frame member assembly with a push handle portion; and, first and second laterally spaced apart mounting structures, the first mounting structure comprising a first shaft and the second mounting structure comprising a second shaft, the first and second shafts being axially aligned one with the other, the perimeter of each of the first and second shafts, in a cross-section that is taken in a plane transverse to a respective length thereof, comprising two mutually parallel flat sides and two convexly curved sides joining the two mutually parallel flat sides; and, a seat assembly comprising at least one seat frame member and third and fourth mounting structures disposed one each on opposite sides of the at least one seat frame member, each one of the third and fourth mounting structures comprising a mounting surface having a recessed slot defined therein, the recessed slot being shaped with a narrow middle portion having a width corresponding substantially to a distance between the two mutually parallel flat sides of a respective one of the first and second shafts, and having a relatively wider end portion disposed one each on opposite sides of the middle portion, wherein the two mutually parallel sides of each of the first and second shafts are aligned with the narrow portion of a respective one of the recessed slots, and thereafter the first and second shafts are urged through the narrow portion from one of the relatively wider end portions to the other of the relatively wider end portions of the respective recessed slot, for detachably mounting the seat assembly to the stroller chassis.

In accordance with an aspect of an embodiment of the invention there is provided a stroller, comprising: a stroller chassis, comprising: a front frame member assembly supporting a pair of laterally spaced apart front wheels; a middle frame member assembly supporting a pair of laterally spaced apart rear wheels; an upper frame member assembly with a push handle portion; and, first and second laterally spaced apart hubs disposed between and interconnecting the front frame member assembly, the middle frame member assembly, and the upper frame member assembly, the first hub having an inwardly facing surface with a raised peripheral portion defining a first rack comprising a first plurality of retaining grooves in a side-by-side arrangement and the second hub having an inwardly facing surface with a raised peripheral portion defining a second rack comprising a second plurality of retaining grooves in a side-by-side arrangement; and, a seat assembly comprising: at least one seat frame member; first and second connector assemblies disposed one each on opposite sides of the at least one seat frame member for detachably mounting the seat assembly to the first and second hubs of the stroller chassis, respectively, the first connector assembly having a first pawl that is normally biased for selectably engaging at a time a portion of the first plurality of retaining grooves of the first rack and the second connector assembly having a second pawl that is normally biased for selectably engaging at the time a corresponding portion of the second plurality of retaining grooves of the second rack; and, first and second control cables each having a controlling end and a pulling end, the pulling end of the first control cable being in communication with the first pawl for controllably moving the first pawl between the normally biased position and a retracted position in which the first pawl is withdrawn from the first plurality of retaining grooves of the first rack, and the pulling end of the second control cable being in communication with the second pawl for controllably moving the second pawl between the normally biased position and a retracted position in which the second pawl is withdrawn from the second plurality of retaining grooves of the second rack, wherein when the first pawl and the second pawl are in the respective retracted positions, the first pawl is movable past the first plurality of retaining grooves of the first rack and the second pawl is movable past the second plurality of retaining grooves of the second rack for adjusting an inclination of the seat assembly relative to the stroller chassis.

In accordance with an aspect of an embodiment of the invention there is provided a stroller, comprising: a stroller chassis comprising a front frame member assembly, a middle frame member assembly, and an upper frame member assembly; first and second laterally spaced-apart mounting members that are disposed between and that couple together the front, middle and upper frame member assemblies, each mounting member comprising a plurality of retaining grooves that are arranged along an arcuate path and in a side-by-side fashion on inwardly facing surfaces of each of the first and second mounting members; and, a seat assembly comprising at least one seat frame member and third and fourth laterally spaced-apart mounting members disposed one each on opposite sides of the at least one seat fame member, the first mounting member and one of the third and fourth mounting members being coupled together and supporting rotation therebetween when the stroller is in an assembled condition and the second mounting member and the other one of the third and fourth mounting members being coupled together and supporting rotation therebetween when the stroller is in the assembled condition, the third and fourth mounting members each comprising a controllably retractable pawl for selectably engaging a portion of the plurality of retaining grooves on one of the first and second mounting members, for retaining the seat assembly in a selected inclination orientation relative to the stroller chassis.

In accordance with an aspect of an embodiment of the invention there is provided a system for mounting an accessory to a stroller, comprising: a hub disposed along a lateral frame member of the stroller and having a first mounting structure defined on an outward facing surface thereof; and, an accessory having a second mounting structure defined on a surface thereof, the second mounting structure different than the first mounting structure, the first and second mounting structures defining complementary halves of an interlocking coupling mechanism; wherein the first mounting structure disposed on the outward facing surface of the hub is aligned with and engages the second mounting structure on the surface of the accessory for detachably mounting the accessory to the stroller.

In accordance with an aspect of an embodiment of the invention there is provided a system for mounting an accessory to a stroller, comprising: a hub disposed along a lateral frame member of the stroller and having one of a raised flange portion and a recessed slot portion of a first interlocking coupling mechanism defined on an outward facing surface thereof; and, an accessory having the other one of the raised flange portion and the recessed slot portion of the first interlocking coupling mechanism defined on a surface thereof, wherein for detachably mounting the accessory to the stroller the one of the raised flange portion and the recessed slot portion of the first hub engages the other one of the raised flange portion and the recessed slot portion on the accessory in a mutually interlocking fashion.

BRIEF DESCRIPTION OF THE DRAWINGS

Exemplary embodiments of the invention will now be described in conjunction with the following drawings, in which:

FIG. 2a is an enlarged view showing the upper left and upper right hubs of the stroller of FIG. 1a;

FIG. 2b is an enlarged view showing the lower left and lower right hubs of the stroller of FIG. 1a;

FIG. 4a shows an enlarged partial detail view of the brake mechanism of the stroller of FIG. 1a;

FIG. 4b shows a further enlarged partial detail view of the brake mechanism of the stroller of FIG. 1a;

FIG. 4d shows an enlarged partial detail view of the brake lever that is mounted on an upper hub of the stroller of FIG. 1a;

FIG. 5b shows the detail within the dotted square area of FIG. 5a;

FIG. 7c shows a side view of the seat mounting structure on the central hub of the stroller of FIG. 1a;

FIG. 7d shows a rear view of the mounting structure on the inner surface of the central hub of the stroller of FIG. 1a;

FIG. 7e shows a top view of the mounting structure on the inner surface of the central hub of the stroller of FIG. 1a;

FIG. 9a shows the child seat frame of the stroller of FIG. 1a in an upright seat position;

FIG. 9b shows the child seat frame of the stroller of FIG. 1a in a normal seat position;

FIG. 9c shows the child seat frame of the stroller of FIG. 1a in a reclined seat position;

FIG. 9d shows the seat reclining mechanism when the seat frame of the stroller of FIG. 1a is in the upright seat position;

FIG. 9e shows the seat reclining mechanism when the seat frame of the stroller of FIG. 1a in the normal seat position;

FIG. 9f shows the seat reclining mechanism when the seat frame of the stroller of FIG. 1a in the reclined seat position;

FIG. 10 shows a cup holder accessory adjacent the upper right hub of the stroller of FIG. 1a; and, FIG. 11 shows a tray accessory mounted on the stroller of FIG. 1a.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1A:
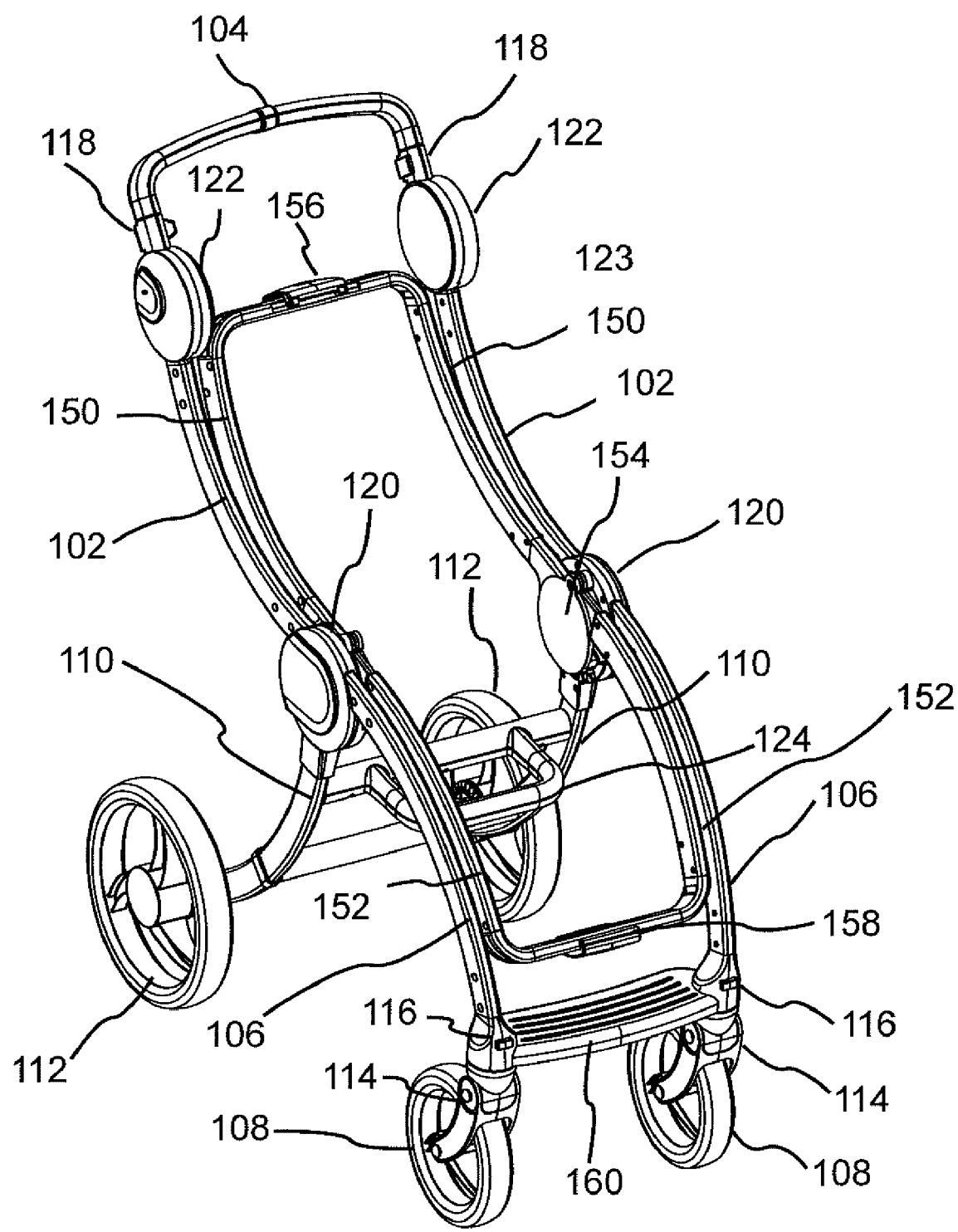
FIG. 1a is a perspective view of a stroller according to an embodiment of the instant invention, with the seat web material omitted for clarity.

Referring to FIG. 1a, shown is a perspective view of a stroller 100 according to an embodiment of the instant invention. The stroller 100 comprises a stroller chassis and an adjustable seat assembly, which is detachably mountable to the stroller chassis in either a rear facing or a front facing orientation. The stroller chassis comprises three radial tubular branch structures, including an upper frame member assembly 102 that extends to form a push handle 104, a front frame member assembly 106 that supports laterally spaced-apart front wheels 108, and a middle frame member assembly 110 that supports laterally spaced-apart rear wheels 112. For improved clarity, the seat web material has been omitted in FIG. 1a.

More particularly, the upper frame member assembly 102 comprises left and right side laterally spaced-apart upper frame members, each having a forward end portion and a rearward end portion. The rearward end portion of each upper frame member has an open end, which is sized and oriented for receiving one end of the push handle 104. Similarly, the front frame member assembly 106 comprises left and right side laterally spaced-apart front frame members each having a forward end portion and a rearward end portion, one of the front wheels 108 being mounted to the forward end portion of each of the front frame members. Finally, the middle frame member assembly 110 comprises left and right side laterally spaced-apart middle frame members each having a forward end portion and a rearward end portion, each rearward end portion being coupled to one of the rear wheels 112. In this context, the term "rearward end portions" denotes the ends of the frame members that are directed toward the rear of the stroller 100 and the term "forward end portions" denotes the ends of the frame members that are directed toward the front of the stroller 100. Further, the "rear" of the stroller 100 is considered to be the end at which the rear wheels 112 are mounted, whilst the "front" of the stroller 100 is considered to be end at which the front wheels 108 are mounted. Additionally, the "left side" of the stroller and the "right side" of the stroller are both defined from the perspective of an operator standing at the rear of the stroller 100 and facing toward the front of the stroller 100.

The front wheels 108 rotate freely about a vertical kingpin steering axis so that the stroller can be easily maneuvered—commonly known as a "caster" wheel. Each front wheel 108 is mounted via an axle to a front wheel fork 114. In this way, the front wheels 108 are aligned laterally with a respective one of the front frame members 106, such that the front wheels 108 do not protrude outwardly along the sides of the stroller 100. Optionally, the front wheels 108 are removable so that the stroller can be made more compact for storage or transport purposes. Quick release mechanisms 116, one for each of the front wheels 108, facilitate removal of the front wheels without the need for tools. Further optionally, the front wheels 108 have a torsion spring or other suitable suspension system (not shown) to provide isolation of road/surface disturbances for a more comfortable ride.

Figure 1B:
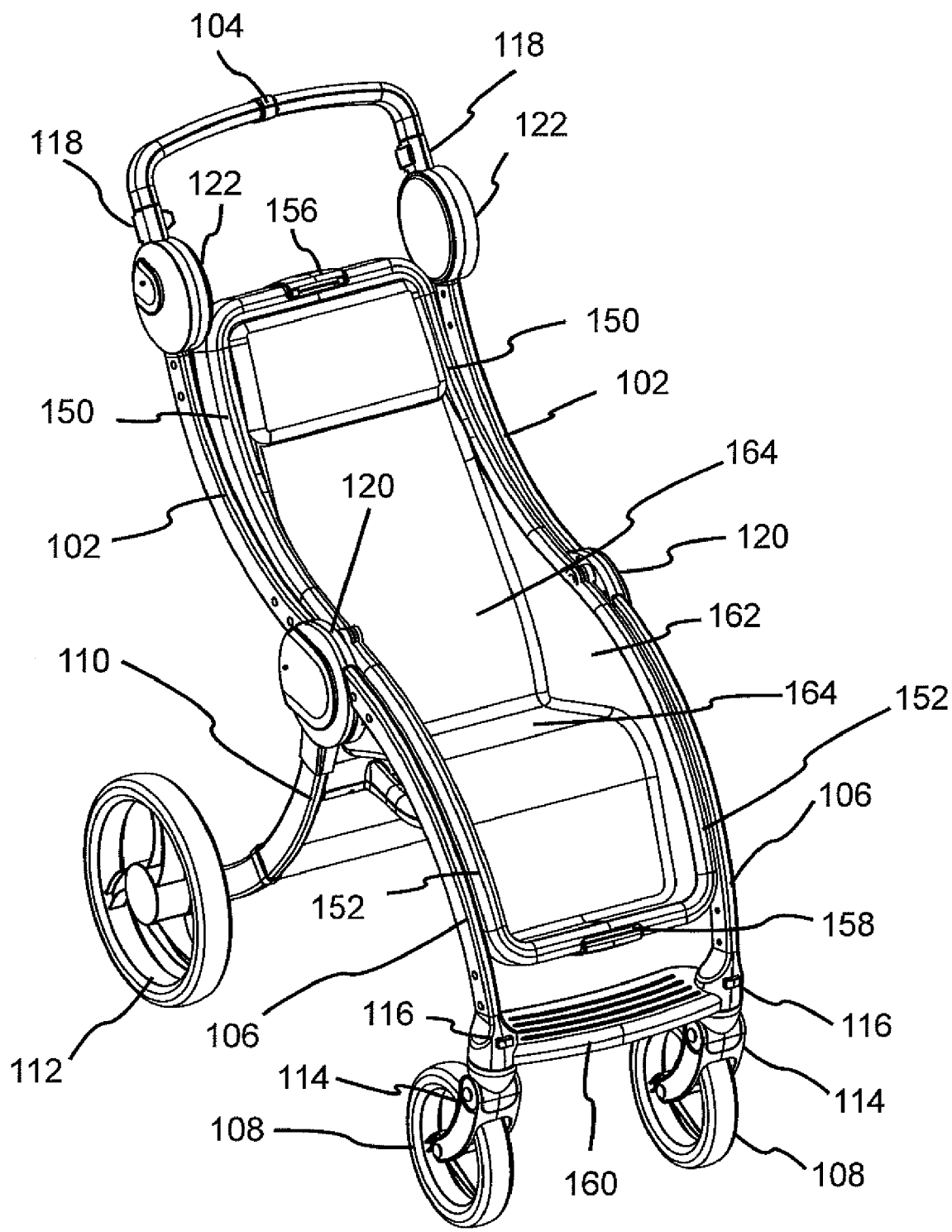
FIG. 1b is a perspective view of the stroller of FIG. 1a with the seat web material illustrated.
Figure 1C:
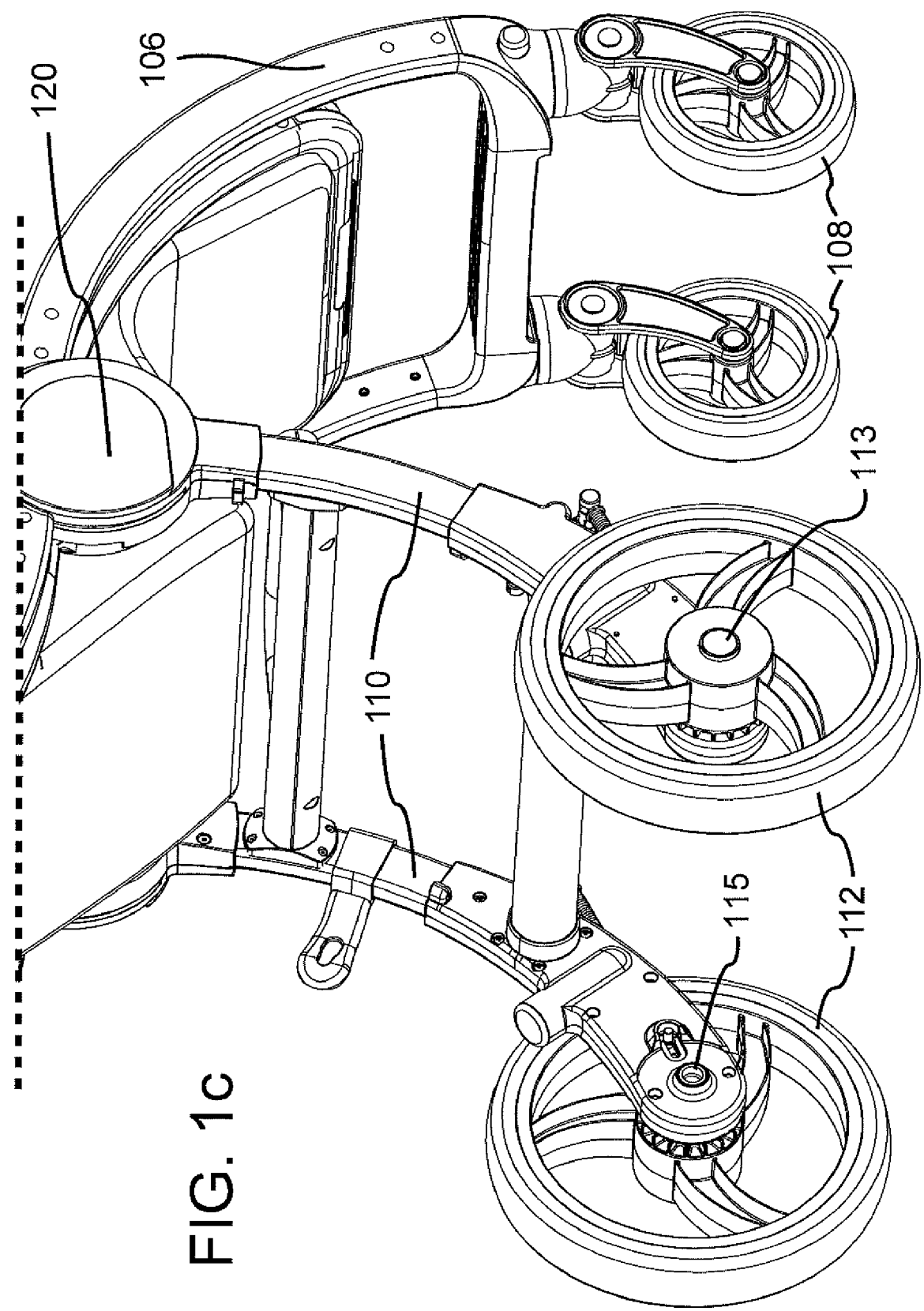
FIG. 1c is a perspective view of the stroller of FIG. 1a, showing the rear wheels mounted to the outer faces of the left side and right side middle frame members.
Figure 1D:
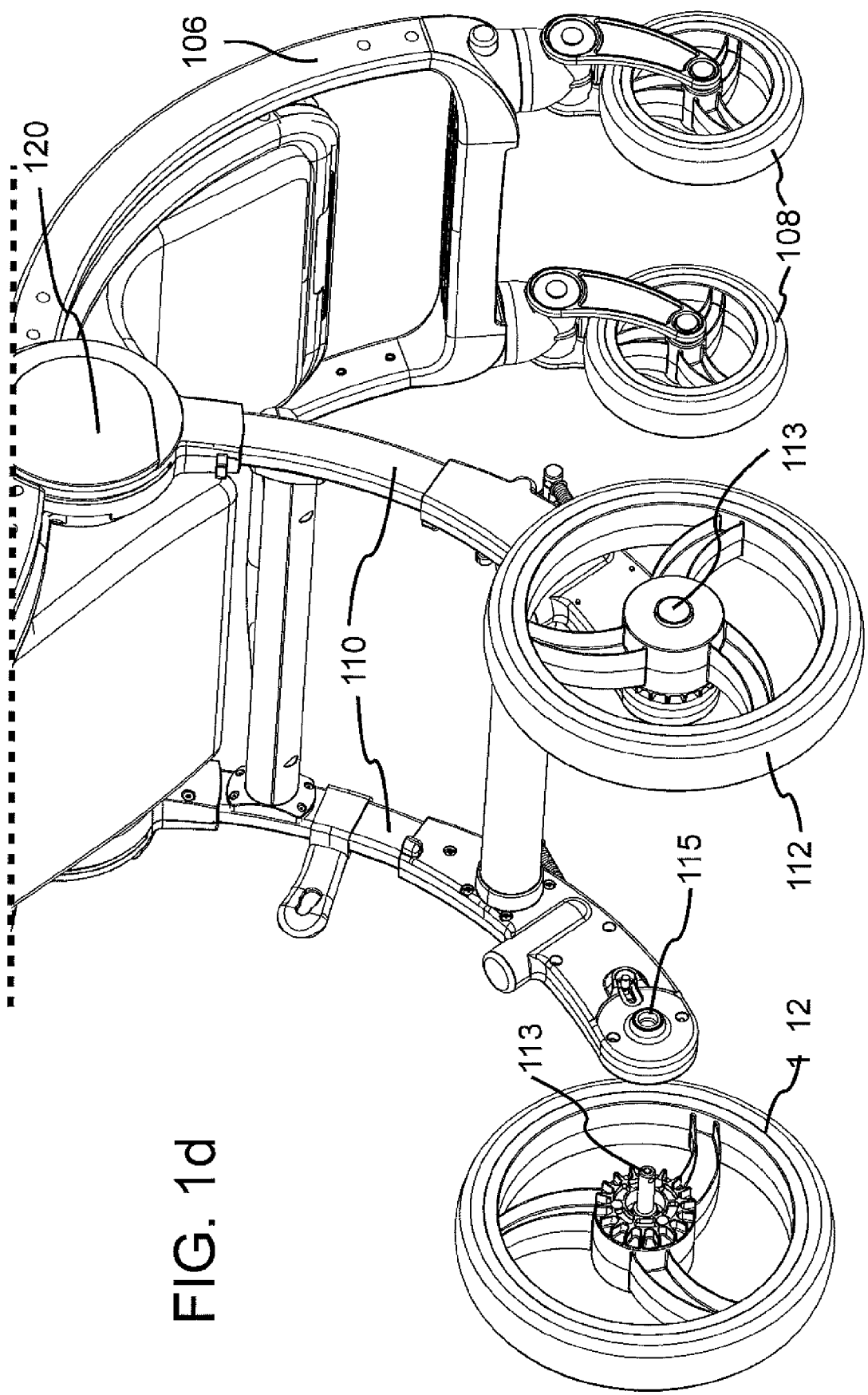
FIG. 1d is a perspective view of the stroller of FIG. 1a, showing the right rear wheel mounted to the outer face of the right side middle frame member, and showing the left rear wheel detached from the left side middle frame member.
Figure 1E:
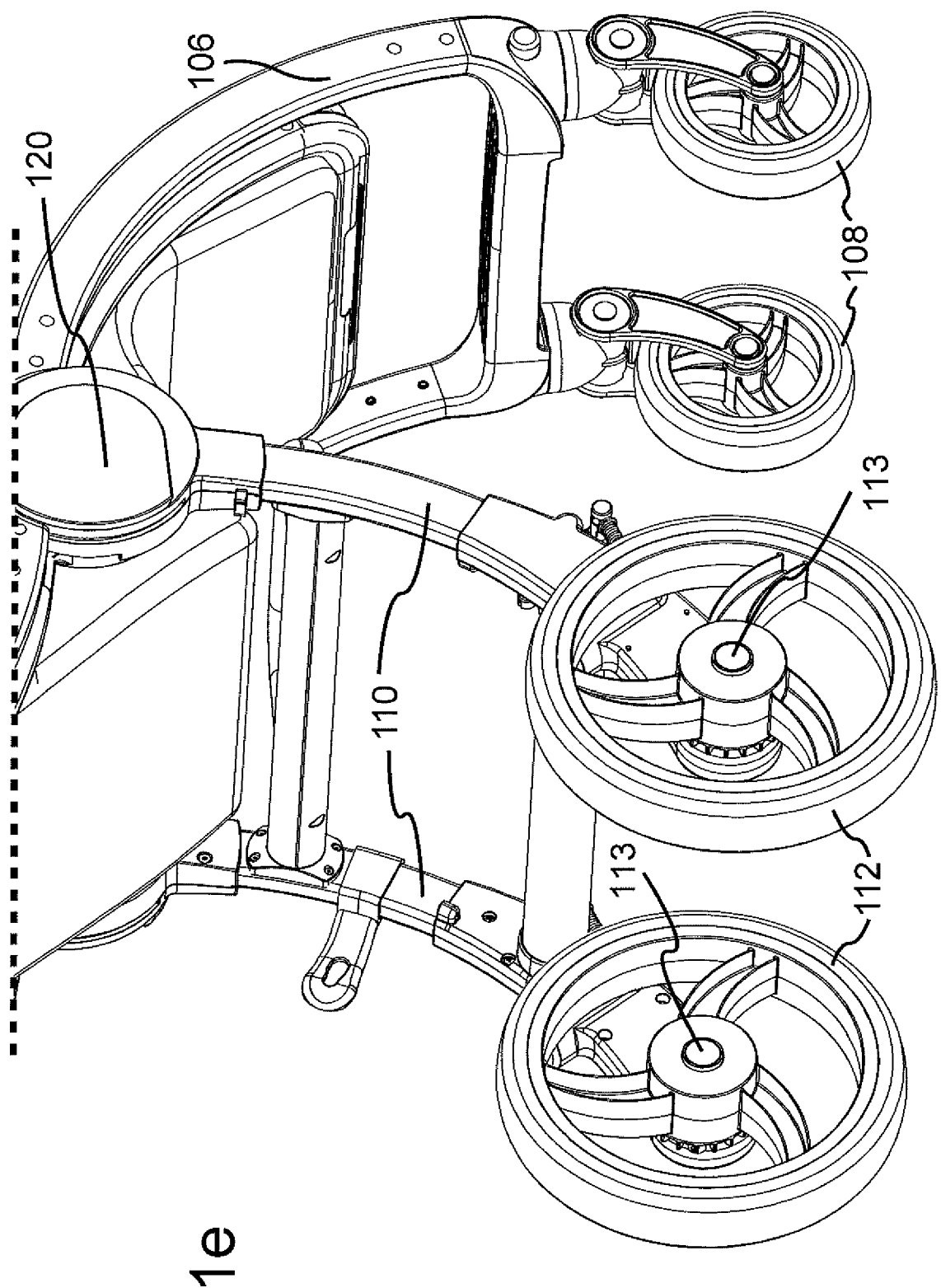
FIG. 1e is a perspective view of the stroller of FIG. 1a, showing the left rear wheel mounted to the inner face of the left side middle frame member, and showing the right rear wheel mounted to the outer face of the right side middle frame member.

As is shown in FIGS. 1c-1e, the rear wheels 112 are detachably mountable to the stroller via quick release mechanisms. By way of a specific and non-limiting example, each rear wheel 112 includes a push-button type quick release axle 113. The axles 113 may be inserted into axle holes 115 that are located along the outer faces of each of the left side and right side middle frame members 110 for use in a detached-stroller mode, or the axles 113 may be inserted into axle holes 115 that are located along the inner faces of each of the left side and right side middle frame members 110 for use in a coupled-stroller mode. As is shown in FIG. 1e, optionally one rear wheel 112 is mounted adjacent to the inner face of one middle frame member 110 whilst the other rear wheel 112 is mounted adjacent to the outer face of the other middle frame member 110. Notably, when the rear wheels 112 are mounted adjacent to the outer faces of the left side and right side middle frame members 110 they cooperate to form a relatively wide and stable base for supporting the stroller 100. In the illustrated embodiment, the rear wheels 112 form a base that is wider than a maximum frame width of the stroller chassis when the rear wheels 112 are mounted on the outer faces of the middle frame members 110. In this configuration, the relatively widely spaced rear wheels 112 prevent the stroller from being excessively tippy when the stroller 100 is operated in the detached-stroller mode. As is discussed in greater detail below, when the rear wheels 112 are mounted on the inner faces of the left side and right side middle frame members 110 the lateral separation between the two rear wheels 112 is less than a lateral separation between the two front wheels 108. The ability to mount the rear wheels 112 on the inner faces of the middle frame members 110 results in a laterally compact coupled-stroller configuration, and avoids the problem of the rear wheel of one stroller interfering with the rear wheel of another stroller when two or more strollers are coupled together in a side-by-side manner. Of course, when only two strollers are coupled together then optionally the rear wheels that are disposed on the coupled (facing) sides of each of the two strollers are required to be mounted to the inner faces of the respective middle frame members. Optionally, the rear wheels that are disposed on the outward facing sides of the coupled strollers remain mounted to the outer faces of the respective middle frame members. Further optionally, a different quick-release mechanism is employed for detachably mounting the rear wheels 112 to the stroller.

Referring again to FIG. 1a, the upper frame member assembly 102, the front frame member assembly 106 and the middle frame member assembly 110 are coupled together via a pair of central hubs 120, which are disposed one each on opposite sides of the stroller chassis. The central hubs 120 define a folding axis therebetween, about which folding axis the upper frame member assembly 102, the front frame member assembly 106 and the middle frame member assembly 110 mutually pivot between a rolling configuration and a folded configuration.

A first mounting structure is defined on an outward facing surface of one of the central hubs 120, and a second mounting structure that is complementary to the first mounting structure is defined on an outward facing surface of the other one of the central hubs 120. Only one of the first and second mounting structures on hubs 120 is shown in FIG. 1a. Two identical or complementary strollers 100 can be coupled together in a side-by-side manner by aligning the complementary mounting structures on respective central hubs 120 of the two strollers, and then slidingly engaging the complementary mounting structures until an interlocking fit is achieved. Additionally, a pair of upper hubs 122 is provided on the upper frame member 102, with the first mounting structure being defined on an outward facing surface of one of the upper hubs 122 and the second mounting structure being defined on an outward facing surface of the other one of the upper hubs 122. Only one of the first and second mounting structures on hubs 122 is shown in FIG. 1a. The complementary mounting structures on respective upper hubs 122 of the two strollers can be interlocked in the same manner as the complementary mounting structures on the central hubs 120, thereby forming a second point of attachment between the two strollers 100.

Optionally, more than two points of attachment are provided in which case additional hubs, and the mounting structures associated therewith, are provided along the opposite sides of the stroller 100. In the example that is shown in FIG. 1a, the mounting structure on the upper hubs 122 is smaller than the mounting structure on the central hubs 120, and the diameter of the upper hubs 122 is smaller than the diameter of the central hubs 120. Optionally, the size of the mounting structure and the hub diameter is substantially the same for both the upper hubs 122 and the central hubs 120. Further optionally, the mounting structure on the upper hubs 122 is larger than the mounting structure on the central hubs 120, and the diameter of the upper hubs 122 is larger than the diameter of the central hubs 120. Additionally, in the instant example "male" portions of the mounting structure are provided on one side of the stroller 100, specifically the right side of the stroller, whilst "female" portions of the mounting structure are provided on the other side of the stroller 100, specifically the left side of the stroller. Optionally a "male" portion of the mounting structure is provided on the upper hub 122 along one side of the stroller and on the central hub 120 along the other side of the stroller, etc.

In order to fold the stroller 100, fold handle 124 is rotated and lifted upward to release a not illustrated locking mechanism disposed in each of the central hubs 120. Continuing to lift the fold handle 124 causes the upper frame member assembly 102 and the front frame member assembly 106 to rotate about the folding axis that is defined between the central hubs 120, until all three frame member assemblies stack together in a sequential arc concentric fashion. As is described in greater detail below, the upper frame member assembly 102 and the front frame member assembly 106 are coupled together by a mechanism that is disposed within the central hubs 120, so that they move in unison. The locking mechanism supports the weight of the stroller 100 when the stroller 100 is being used in its rolling or unfolded configuration.

In the example that is shown in FIG. 1*a* and FIG. 1*b* the seat assembly is provided in the form of a foldable toddler seat. The foldable toddler seat comprises an upper seat frame 150 and a lower seat frame 152, which are pivotally connected one to the other via connector assembly 154. Outward facing surfaces of the connector assembly 154 on opposite sides of the seat assembly have a mounting structure for engaging a complementary mounting structure that is defined on inward facing surfaces of each of the central hubs 120. During use, the seat assembly is lowered toward the stroller chassis until the mounting structure of the seat assembly engages the mounting structure of the stroller chassis. The seat assembly locks into the stroller chassis in either a front facing orientation (shown) or a rear facing orientation (not shown).

Integrated into the upper seat frame 150 is toddler seat recline adjust handle 156. Actuating the toddler seat recline adjust handle 156 releases a mechanism in the connector assembly 154, which permits the toddler seat to be moved into one of three supported inclination positions.

A toddler seat grab handle 158 is integrated into the lower seat frame 152. Actuating the toddler seat grab handle 158 releases a mechanism in the connector assembly 154 and allows the lower seat frame 152 to be folded in an upward direction toward the upper seat frame 150, after which the toddler seat may be detached and lifted away from the stroller chassis.

A footrest or step 160 is also provided to allow a child to step up into the stroller 100, or to prevent the child's feet from dragging on the ground surface when sitting in the foldable toddler seat.

Optionally, the push handle 104 is telescopically adjustable to provide height and setback adjustment for users of different heights. For instance, the push handle 104 is held in position by two cam clamp mechanisms 118—one on each side of the handle 104. Optionally, the push handle 104 is covered with a soft foam material for comfort.

Optionally, the stroller 100 is equipped with a not illustrated canopy system that provides protection to the child from sun or rain and that is adjustable so that it can be fully retracted out of the way or fully deployed to completely cover the child. Further optionally, the stroller is equipped with a not illustrated storage basket underneath the seating area. The storage basket is at least partially constructed from a flexible fabric material so that it collapses when the stroller is folded.

Referring now to FIG. 1*b*, shown is the stroller 100 with the seat web material in position. The seat web material includes flexible sides 162 that are fastened to and suspended from the upper seat frame 150 and the lower seat frame 152, and which supports a central seating surface 164. Optionally, the central seating surface 164 is reinforced with rigid support members such as for instance plastic or fiberboard inserts. Further optionally the central seating surface 164 is padded for the comfort of the occupant and/or covered with a weather resistant material.

Optionally, the seat assembly is provided in the form of a rear-facing infant car seat or a bassinette. When two or more strollers are coupled together, different seat assembly types may be mounted in different strollers such that children of varying ages may be transported in comfort and safety. The infant car seat or the bassinette may be mounted to the stroller chassis in either a forward facing or a rearward facing orientation.

Referring now to FIGS. 2*a* and 2*b*, shown are enlarged views of the upper hubs 122 and central hubs 120, respectively. With reference to FIG. 2*a*, the upper hub 122*a* includes a raised flange 200 projecting from the outward facing surface 202 thereof. The raised flange has an inwardly beveled edge 204 around at least a portion of its periphery. The upper hub 122*b* includes a slot 206 that is recessed below the outward facing surface 208 thereof. The recessed slot 206 has an outwardly beveled edge 210 around a portion of its periphery. When two strollers 100 are coupled together, the hub 122*a* of one stroller 100 is aligned with the hub 122*b* of the other stroller (100', see FIG. 3) and the raised flange 200 is slidingly engaged in the recessed slot 206. In order to facilitate the interconnection of the flange 200 and the slot 206, the flange 200 is convexly curved along a leading edge thereof in a direction of sliding engagement. The recessed slot 206 is shaped to accommodate the convexly curved leading edge of the raised flange 200. Disposed within the recessed slot 206 is a releasable retaining mechanism or latch 212 for retaining the flange 200 and the slot 206 in an interconnected state. A not illustrated actuator releases the retaining mechanism 212 when the strollers are to be decoupled.

With reference to FIG. 2*b*, the central hub 120*a* includes a raised flange 220 projecting from the outward facing surface 222 thereof. The raised flange has an inwardly beveled edge 224 around at least a portion of its periphery. The central hub 120*b* includes a slot 226 that is recessed below the outward facing surface 228 thereof. The recessed slot 226 has an outwardly beveled edge 230 around a portion of its periphery. When two strollers 100 are coupled together, the hub 120*a* of one stroller 100 is aligned with the hub 120*b* of the other stroller and the raised flange 220 is slidingly engaged in the recessed slot 226. In order to facilitate the interconnection of the flange 220 and the slot 226, the flange 220 is convexly curved along a leading edge thereof in a direction of sliding engagement. The recessed slot 226 is shaped to accommodate the convexly curved leading edge of the raised flange 220. Disposed within the recessed slot 226 is a releasable retaining mechanism or latch 232 for retaining the flange 220 and the slot 226 in an interconnected state. A not illustrated actuator releases the retaining mechanism 232 when the strollers are to be decoupled.

Figure 2C:
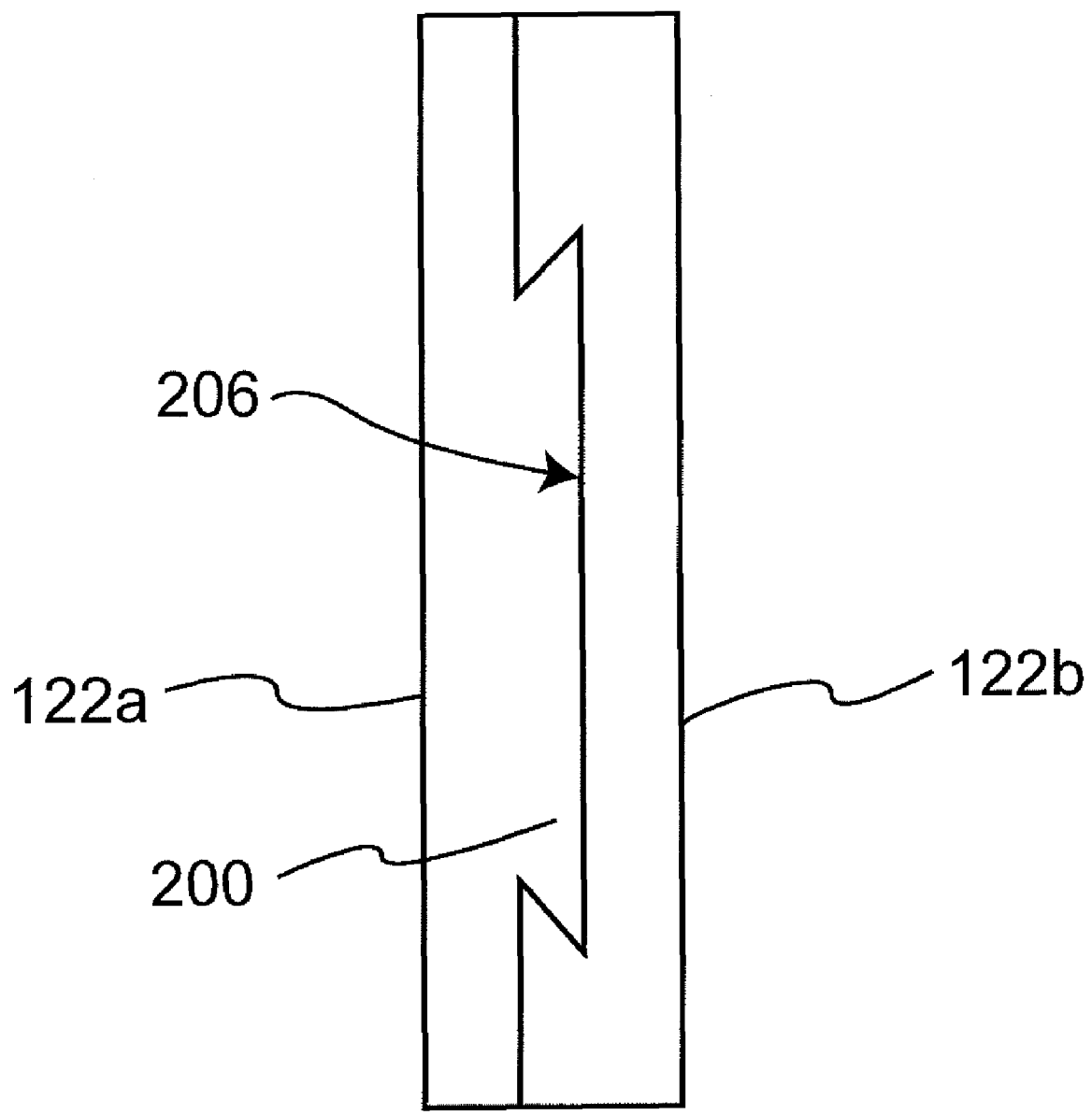
FIG. 2c shows the upper hubs of two strollers in a coupled condition.

Referring now to FIG. 2*c*, shown is a rear view of the upper hubs of two strollers in a coupled condition. As is shown in FIG. 2*c*, the projecting flange 200 of one upper hub and the recessed slot 206 of another upper hub cooperate to form a "dove-tail" like connection, when viewed from the rear of the stroller 100 along a direction toward the front of the stroller 100. The central hubs interconnect one with another in an analogous fashion. FIG. 2*c* illustrates the laterally compact nature of the mounting structure that is used to couple two strollers 100 together. In particular, the thickness of two hubs when coupled together is smaller than the sum of the thickness of the two hubs separately, including the associated mounting structure. The mounting structure that is shown in detail in FIGS. 2*a*-2*c* supports very close coupling together of two or more strollers, providing a relatively narrow structure when two or more strollers are coupled, which facilitates releasable use in urban environments where narrow doorways, crowded aisles, etc. are expected to be encountered. Alternatively, the mounting structure that is shown in FIGS. 2a-2c is rapidly decoupled, thereby allowing each of the two or more strollers to navigate narrow or crowded spaces separately.

Figure 3:
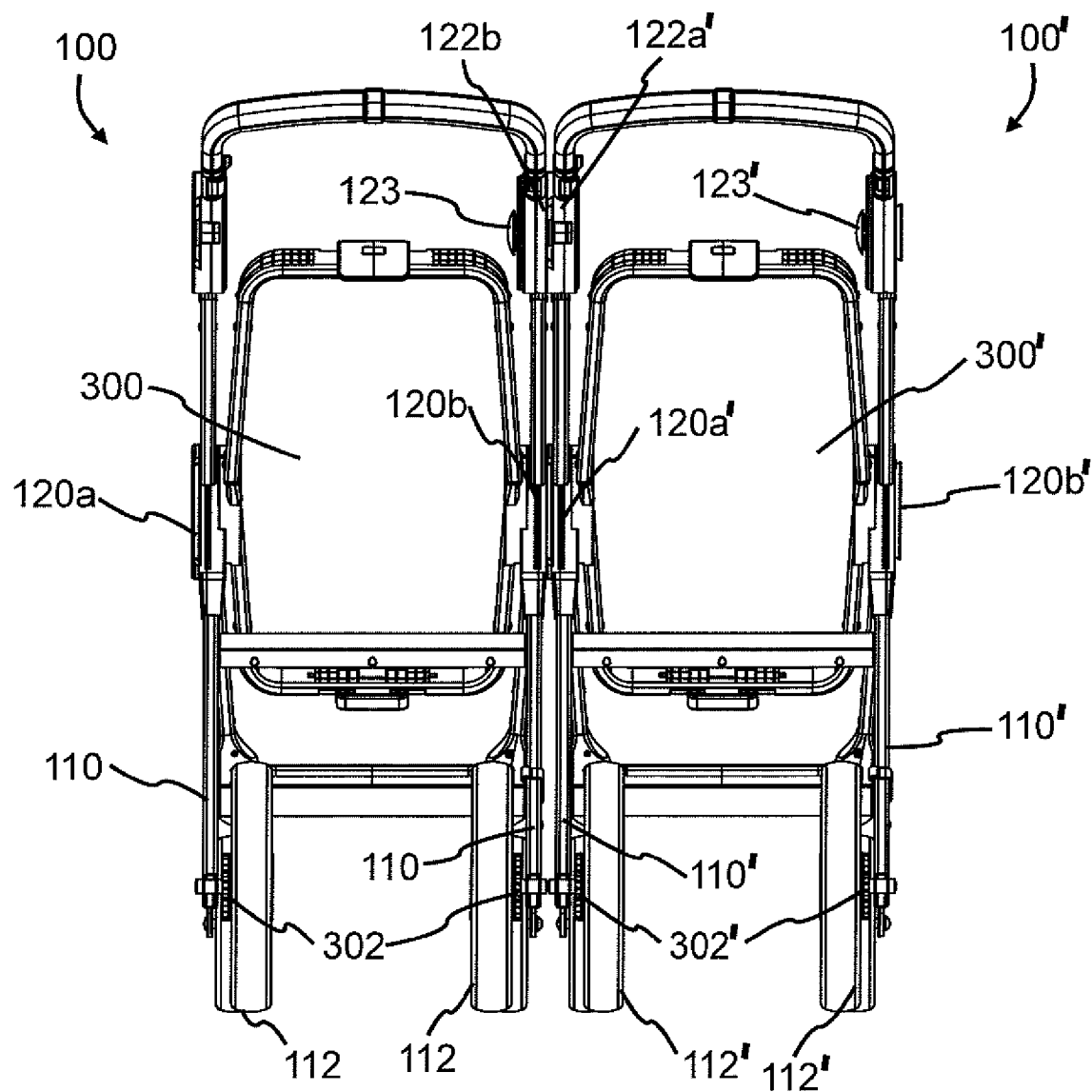
FIG. 3 is a rear view showing first and second strollers in a coupled condition, according to an embodiment of the instant invention.

Referring now to FIG. 3, shown is a rear view of a first stroller 100 and a second stroller 100' coupled together, for operation in a coupled-stroller mode. In particular, the central hub 120b and upper hub 122b of stroller 100 are interconnected with the central hub 120a' and upper hub 122a' of stroller 100', respectively. As such, stroller 100 and stroller 100' are interconnected at two points of attachment. Also shown in FIG. 3 are the attachment of rear wheels 112 and 112' to the inner faces of middle frame members 110 and 110', respectively. Thus, the rear wheel 112 on the right-hand side of stroller 100 is spaced apart from the rear wheel 112' on the left-hand side of stroller 100', thereby avoiding mutual interference. At the same time, the wide spacing between the rear wheel 112 on the left-hand side of stroller 100 and the rear wheel 112' on the right-hand side of stroller 100' provides a stable base for the for the coupled-stroller mode. Also shown in FIG. 3, each rear wheel 112 or 112' includes a toothed hub 302 or 302', respectively, which is disposed adjacent to the middle frame member 110 or 110', respectively, when the rear wheel 112 or 112' is mounted thereto.

In the context of FIG. 3, and throughout the rest of this document, an "inner face" or an "inward facing surface" is considered to be the face or surface of a stroller component that is directed toward a stroller centerline running along the length of the stroller. Thus, "inner faces" or "inward facing surfaces" of a stroller component typically face one another due to the approximate symmetry of the stroller components relative to the stroller centerline. Similarly, an "outer face" or an "outward facing surface" is considered to be the face or surface of a stroller component that is directed away from the stroller centerline. Thus, "outer faces" or "outward facing surfaces" of a stroller component do not face one another.

Figure 4A:
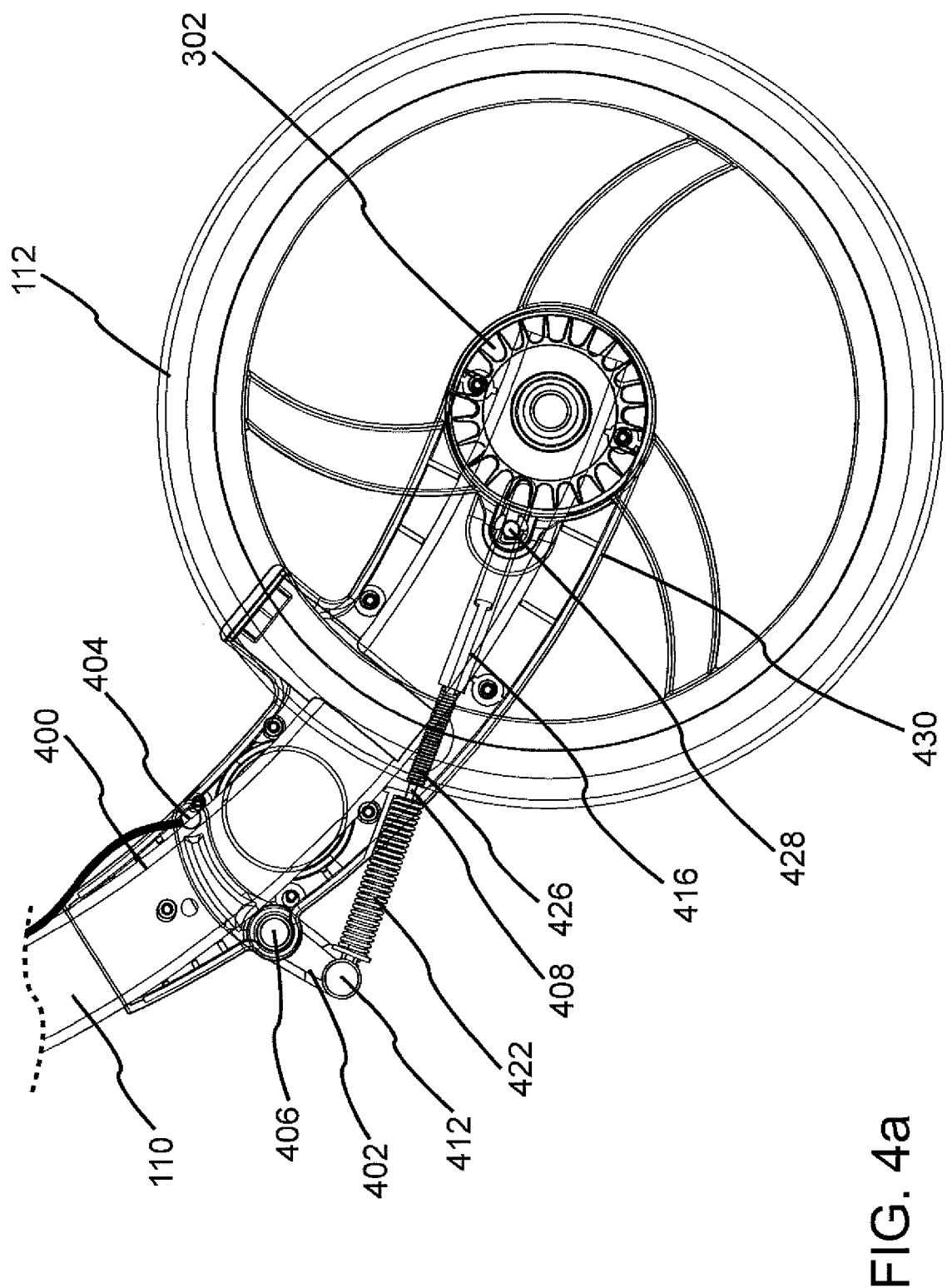
Figure 4B:
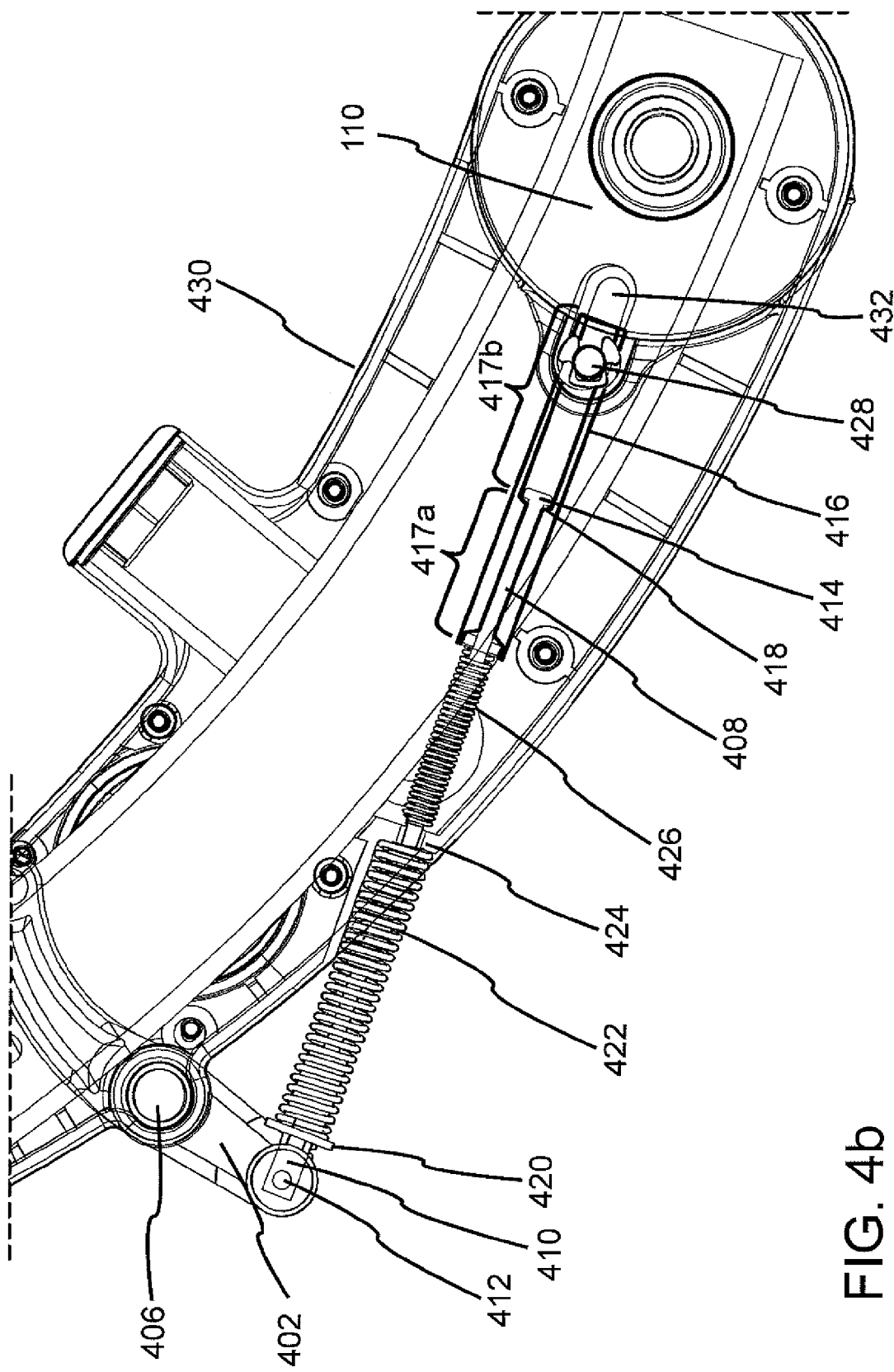
Figure 4C:
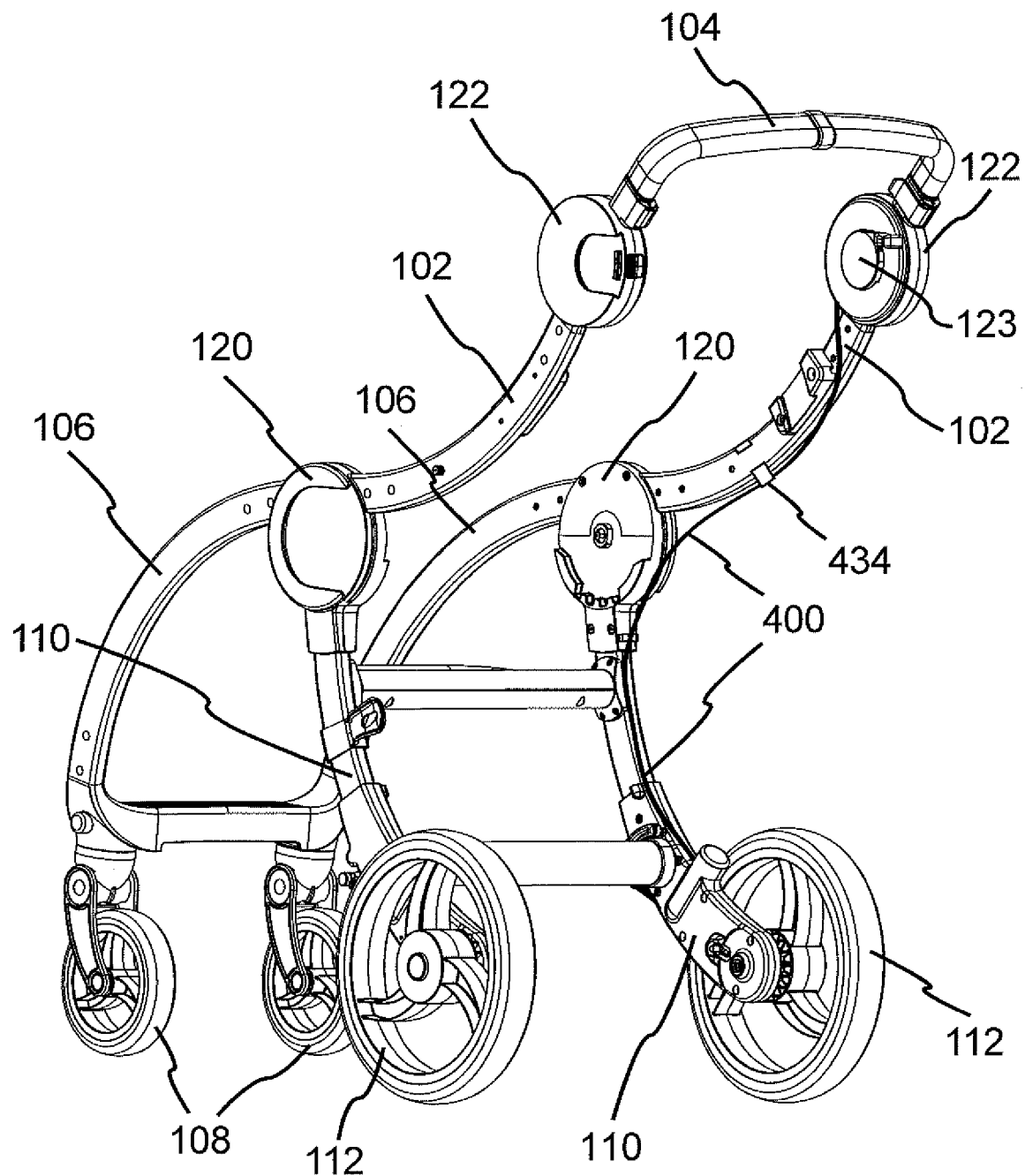
FIG. 4c is a rear perspective view of the stroller of FIG. 1a, showing the brake lever and cable system.
Figure 4D:
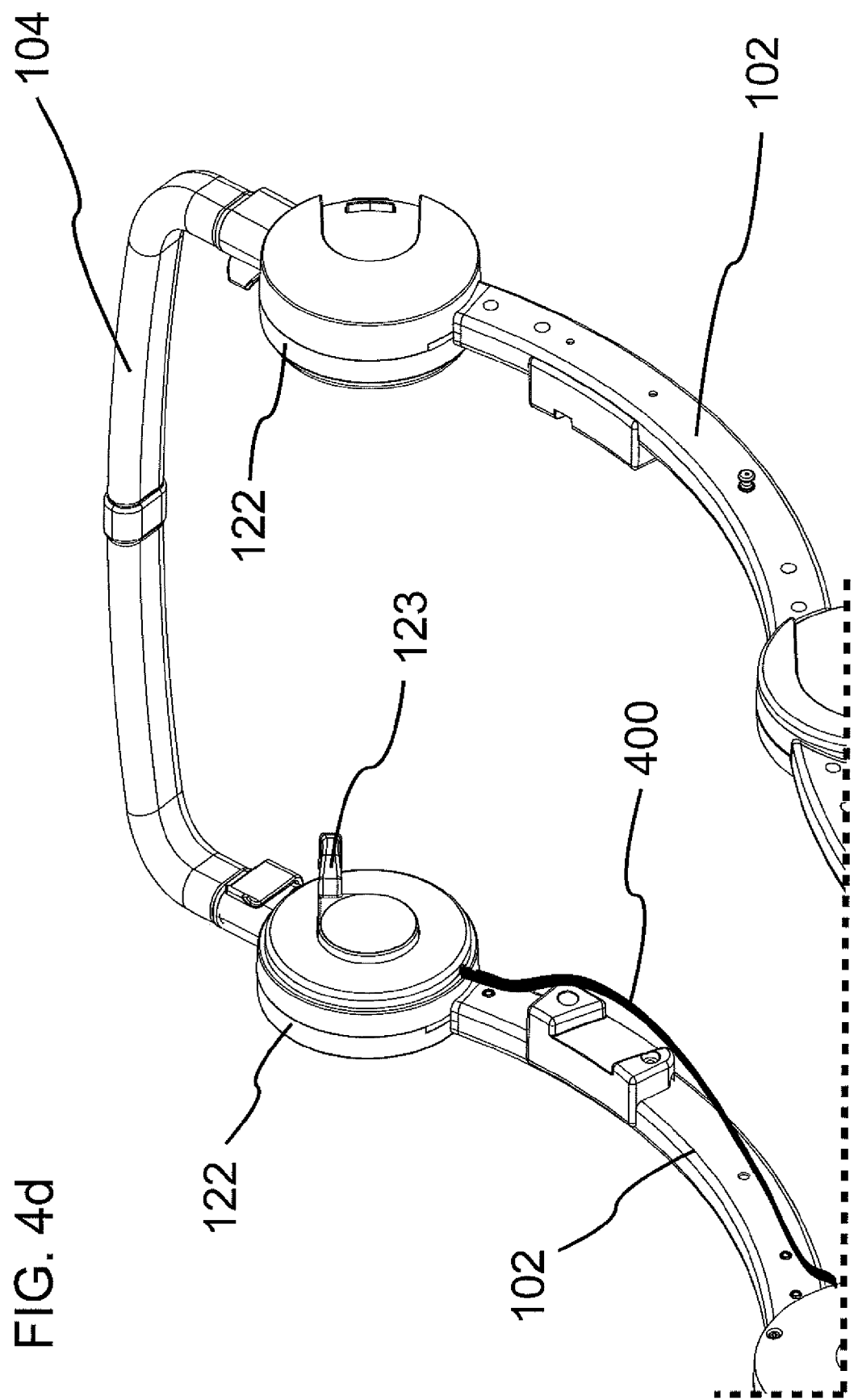

Referring now to FIGS. 4a and 4b, shown is a brake mechanism according to an embodiment of the instant invention. FIGS. 4c and 4d additionally show a brake lever 123 and a control cable 400 for remotely actuating the brake mechanism. As is shown most clearly in FIG. 4a, one end of the control cable 400 is connected to a first end of rocker arm 402 at connection point 404. The other end of the control cable 400 is connected to the brake lever 123, which is disposed on one of the upper hubs 122, as is shown most clearly in FIG. 4d. Rocker arm 402 is pivotally mounted on a rocker pivot pin 406. A first end of a retaining rod 408 is pivotally coupled to a second end of the rocker arm 402 via a swivel seat 410, which is secured to the second end of the rocker arm 402 by pin 412. A second end of the retaining rod 408 has a flange 414 extending perpendicularly from the retaining rod 408. The second end of the retaining rod 408 is disposed within a lock-pin support member 416. The lock-pin support member has a passageway extending therethrough between first and second opposite ends thereof. A first portion of the passageway 417a that is proximate the first end is dimensioned smaller than the retaining rod flange 414, and a second portion of the passageway 417b that is proximate the second end is dimensioned larger than the retaining rod flange 414. A transition between the first portion of the passageway 417a and the second portion of the passageway 417b defines an interior bearing-surface 418. As is shown most clearly in FIG. 4b, the retaining rod flange 414 faces the interior bearing-surface 418 and acts to limit the travel of the lock-pin support member 416 in a direction away from the rocker arm. A lock-pin 428 is mounted perpendicularly to the lock-pin support member 416 proximate the second end thereof. The lock-pin 428 extends in first and second opposite directions, into and out of the plane of the page in FIG. 4b, from the lock-pin support member 416.

The swivel seat 410 includes a flange 420 against which a first end of a first resilient member 422 is retained. A second end of the first resilient member 422 is retained against a first side of a stop 424. In addition, a second resilient member 426 is disposed between a second side of the stop 424 and the first end of the lock-pin support member 416. In the instant example, the first resilient member 422 and the second resilient member 426 are both compression springs. As is shown in FIG. 4a and FIG. 4b, the brake mechanism components are at least partially enclosed by a housing 430. In the instant example, the stop 424 is integrally formed with the housing 430.

When the control cable 400 is pulled by the action of rotating the brake lever 123, the rocker arm 402 is caused to pivot about rocker pivot pin 406. As the rocker arm 402 pivots, the first resilient member 422 is compressed against stop 424 and the retaining rod 408 moves in a direction toward the toothed hub 302. The second resilient member 426 pushes the lock-pin support member 416 along the direction of movement of the retaining rod 408, thereby moving the lock-pin 428 into a retaining groove between two adjacent teeth of the toothed hub 302.

When the brake lever 123 is lifted by an operator past a locking detent position, the first resilient member 422 forces the rocker arm back into a driving position, thereby compressing the second resilient member 426 and causing the retaining rod 408 and the lock-pin support member 416 to move in a direction away from the toothed hub 302, so as to remove the lock-pin 428 from the retaining groove between two adjacent teeth of the toothed hub.

The components of the brake mechanism are mounted to the middle frame member 110 in such a way as to provide braking functionality when the rear wheels 112 of stroller 100 are mounted adjacent to either the inner faces or the outer faces of the middle frame member assembly 110. In particular, the lock-pin 428 is mounted perpendicular to the lock-pin support member 416 and extends both into and out of the plane of the page in FIG. 4b. Extending into the plane of the page, the lock-pin 428 passes through a slot 432 in middle frame member 110, and protrudes through to the opposite side of middle frame member 110. During use, the lock-pin 428 travels within the slot 432. Extending out of the page, the lock-pin 428 passes through a not illustrated slot in a not illustrated housing member that is secured over the brake mechanism components when in an assembled condition. Thus, the lock-pin 428 protrudes away from both the inner and outer faces of the middle frame member 110, such that lock-pin 428 is capable of engaging the toothed hub 302 when the rear wheel 112 is mounted adjacent to either the inner face or the outer face of the middle frame member 110. Additionally, a not illustrated torque tube is aligned with the rocker pivot pin 406 for transmitting motion to a second rocker arm of a second brake assembly that is mounted to the middle frame member 110 on the opposite side of the stroller. Accordingly, by rotating a single brake lever 123 an operator is able to actuate simultaneously the brake mechanisms adjacent to each one of the rear wheels 112 of stroller 100.

Referring again to FIGS. 4c and 4d, the brake lever 123 is disposed on the inward facing surface of one of the upper hubs 122, which in this case is the right-hand side upper hub. The brake lever 123 is hand-actuatable, and is in communication with the above-mentioned brake mechanisms disposed near the rear wheels 112 via the control cable 400, which extends along the upper frame member 102 from the upper hub 122 to the central hub 120, and along the middle frame member 110 from the central hub 120 to a brake mechanism. Clips 434 are used to secure the control cable 400 to the frame members 102 and 110. When the brake lever 123 is rotated downward by a predetermined amount, a locking detent is engaged to hold the brake lever 123 in a braking position. The action of rotating the lever pulls on the cable 400, to remotely activate the brake mechanism.

Figure 5A:
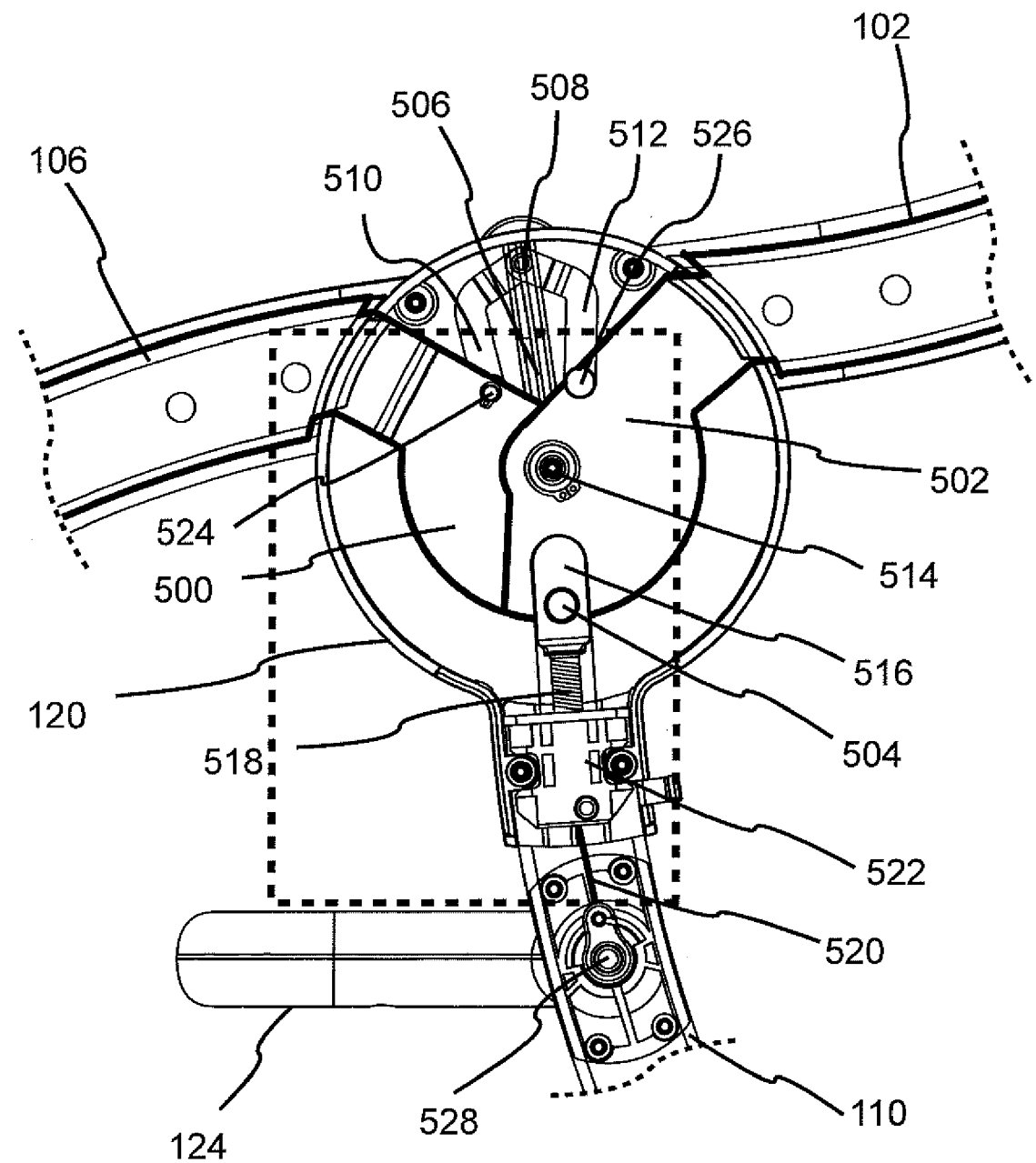
FIG. 5a is a partial side view showing the lower left hub interior mechanism detail of the stroller of FIG. 1a, when in a rolling or unfolded configuration.

Referring now to FIG. 5a, shown is a folding mechanism according to an embodiment of the instant invention. In particular, the folding mechanism is shown in FIG. 5a in a rolling or unfolded condition. The folding mechanism includes a first rotatable member 500, and a second rotatable member 502. The first rotatable member 500 has a generally pie-wedge shaped, flat plate portion with an aperture disposed proximate the vertex thereof, and an elongated arm for attachment to front frame member 106. Similarly, the second rotatable member 502 has a generally pie-wedge shaped, flat plate portion with an aperture disposed proximate the vertex thereof and an elongated arm for attachment to the upper frame member 102. For each of the first and second rotatable members 500 and 502, the flat plate portions and the elongated arms are depicted as being formed of a single flat piece; however, in other implementations the flat plate portions and the elongated arms are optionally individual pieces that are fixedly attached together.

The first and second rotatable members 500 and 502 are contained between inner and outer slotted halves of a housing, hub 120, allowing the elongated arms to protrude outside of the housing. Also contained within the housing is a linkage assembly, including a linkage pin 508, a first linkage arm 510, and a second linkage arm 512. A first end of the first linkage arm 510 is pivotally coupled to the first rotatable member 500 via pin 524. Similarly, a first end of the second linkage arm 512 is pivotally coupled to the second rotatable member 502 via pin 526. Linkage pin 508 couples together a second end of the first linkage arm 510 and a second end of the second linkage arm 512. Additionally, the inside wall of at least one of the inner half and the outer half of the housing has a slot or guide-channel 506, which is sized and shaped to receive the linkage pin 508. The first and second rotatable members 500 and 502 are coupled to the linkage pin 508, and thus to one another, via the first and second linkage arms 510 and 512 and the linkage pin 508. During operation, the linkage pin 508 slidingly travels within the guide-channel 506, such that the first rotatable member 500 and the second rotatable member 502 rotate relative to each other in a synchronized fashion when the foldable stroller is converted between a rolling configuration and a folded configuration.

The apertures of the first and second rotatable members are sized to receive a bushing 514 therethrough, the bushing 514 having a length that is longer than the cumulative thickness of the two rotatable members. The first and second rotatable members are rotatably mounted on the bushing for rotation in parallel rotation planes about an axis of rotation transverse to the plane of the flat plate portions. The end portions of the bushing extend beyond the apertures, and have a circumferential groove to receive a C-clip to retain the bushing in place. The bushing also extends through a not illustrated washer disposed between the flat plate portions of the first and second rotatable members 500 and 502, respectively, to serve as a spacer and bearing surface for rotational movement of the rotatable members about the bushing.

The first rotatable member 500 and the second rotatable member 502 each has a notch defined along the perimeter thereof, at respective locations for receiving lock-pin 504 when the stroller is in the rolling, or unfolded, configuration. The lock-pin 504 is carried by a sliding block 516, which is normally biased toward the first and second rotatable members 500 and 502 by spring 518. A cable 520 extends through the middle frame member 110 between the fold handle 124 and sliding support 522. When the fold handle 124 is lifted upwards, a cable hook 528 rotates and causes the cable 520 to pull the sliding block 516 and compress the spring 518. As sliding block 516 continues to move in a direction to compress the spring 518, lock-pin 504 is withdrawn from the notches in the first and second rotatable members 500 and 502, so as to release the locking mechanism that prevents stroller folding.

When the fold handle 124 is lifted and the lock-pin 504 is withdrawn from the locking position, the first and second rotatable members 500 and 502 pivot about bushing 514 as the upper frame member assembly 102 and the front frame member assembly 106 begin to move downward under the influence of gravity. The first and second rotatable members 500 and 502 are coupled together via the first and second linkage arms 510 and 512 and the linkage pin 508. The linkage pin 508 travels along guide-channel 506 as the first and second rotatable members 500 and 502 pivot toward the folded condition. As a result, the interconnected first and second rotatable members 500 and 502 pivot in unison as the stroller 100 is converted between the rolling configuration and the folded configuration.

Figure 5B:
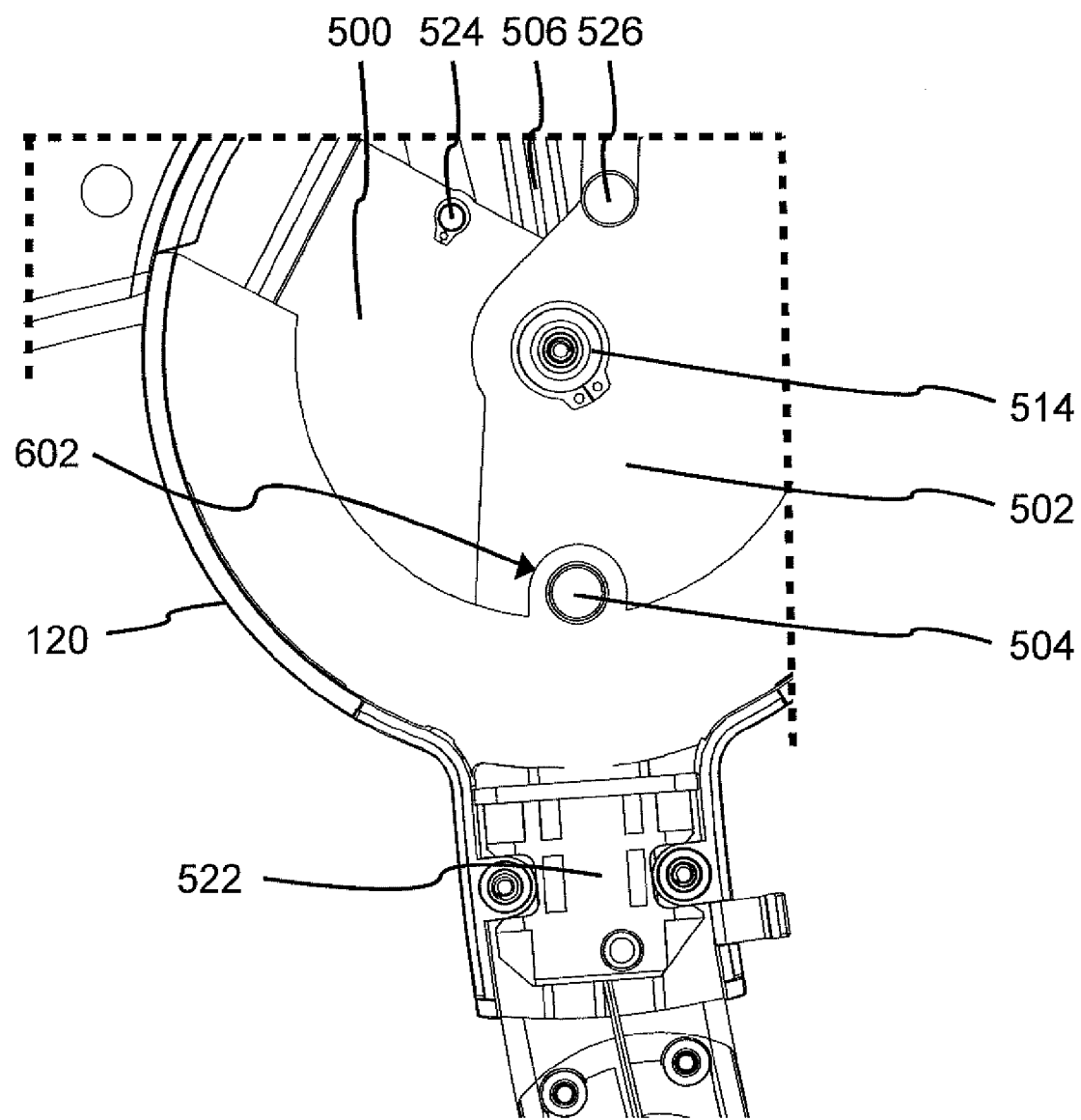

FIG. 5b shows a portion of FIG. 5a that is within the dashed-line square. In particular, FIG. 5b omits the sliding block 516 so as to show more clearly the lock-pin 504 seated within the notches that are defined in the first and second rotatable members 500 and 502. Since the first and second rotatable members 500 and 502 overlap substantially, only the notch 602 that is defined in the second rotatable member 502 is visible in FIG. 5b.

Figure 5C:
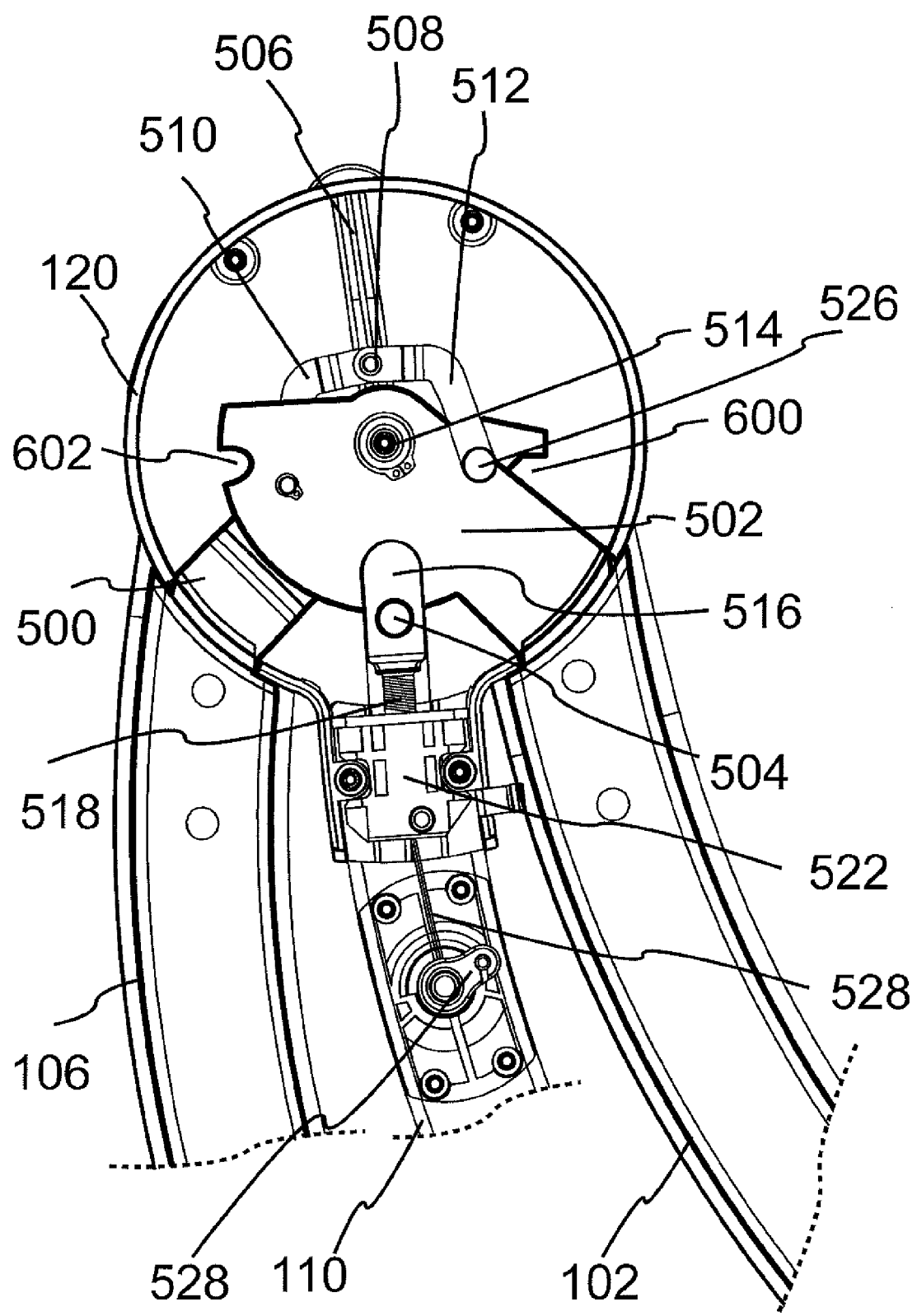
FIG. 5c shows the lower left hub interior mechanism of the stroller of FIG. 1a in a folded configuration.

Referring now to FIG. 5c, shown is the mechanism of FIG. 5a in a folded configuration. FIG. 5c shows more clearly that the first rotatable member 500 has a notch 600 and that the second rotatable member 502 has a notch 602. In the rolling configuration that is shown in FIG. 5a, the notch 600 and the notch 602 are aligned one with the other and retain the lock pin 504, thereby supporting the weight of stroller 100 and preventing folding of the same.

The folding mechanism that is shown in FIGS. 5a-5c is laterally compact and reduces the number of moving parts compared to known stroller folding mechanisms.

Figure 6A:
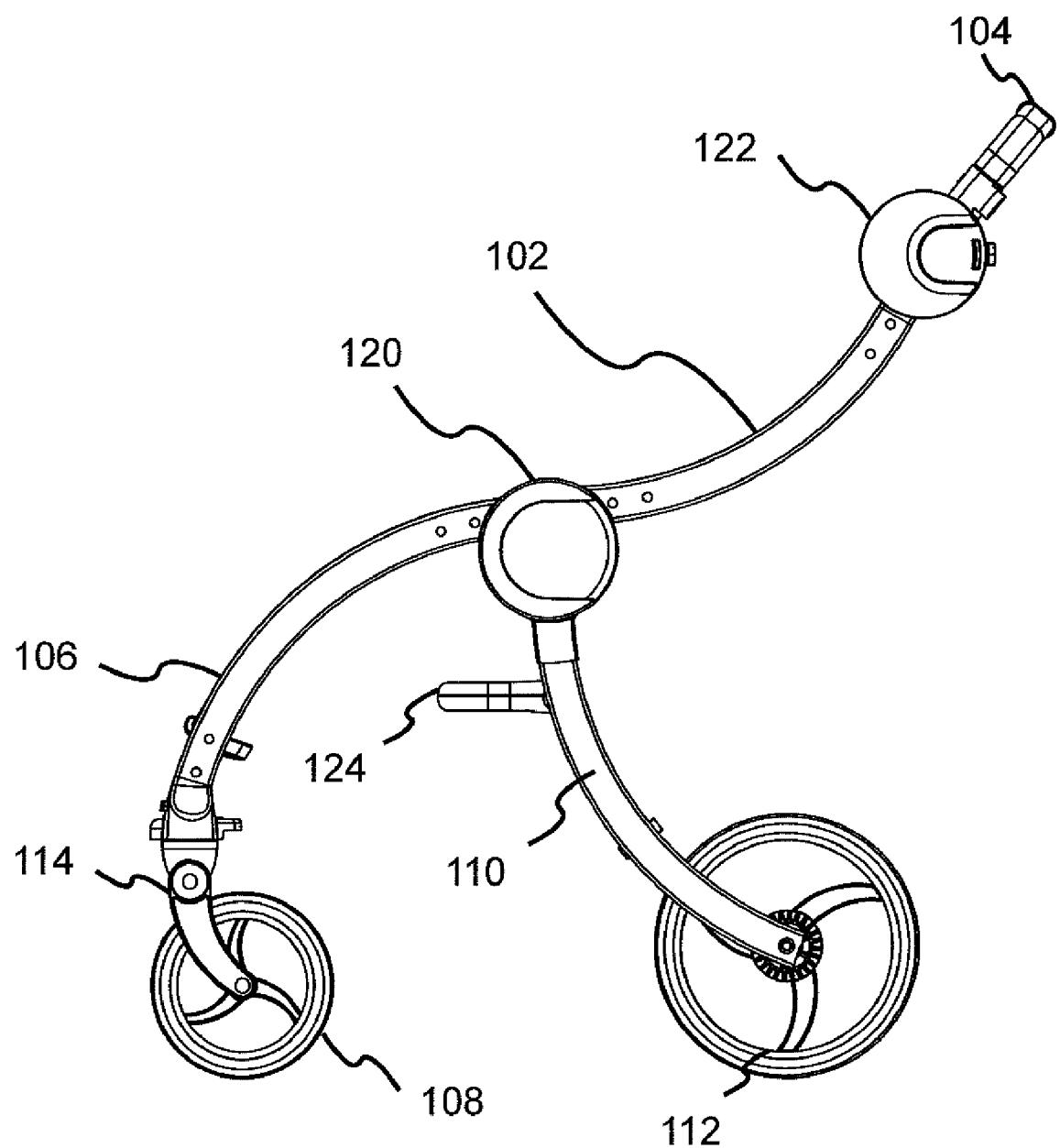
FIG. 6a is a side view of the stroller chassis of FIG. 1a in a rolling configuration.
Figure 6B:
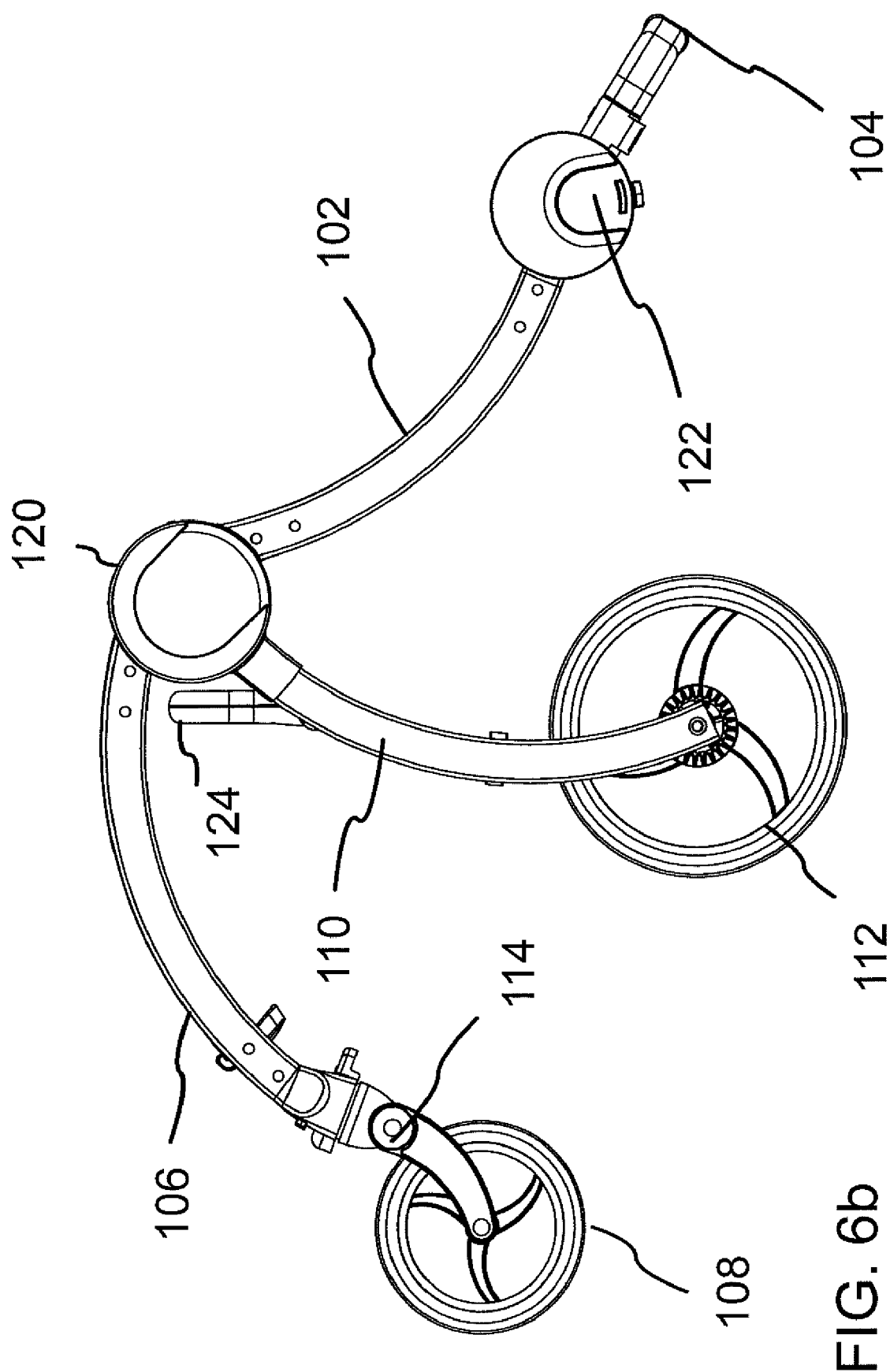
FIG. 6b is a side view of the stroller chassis of FIG. 1a in a partially-folded configuration.
Figure 6C:
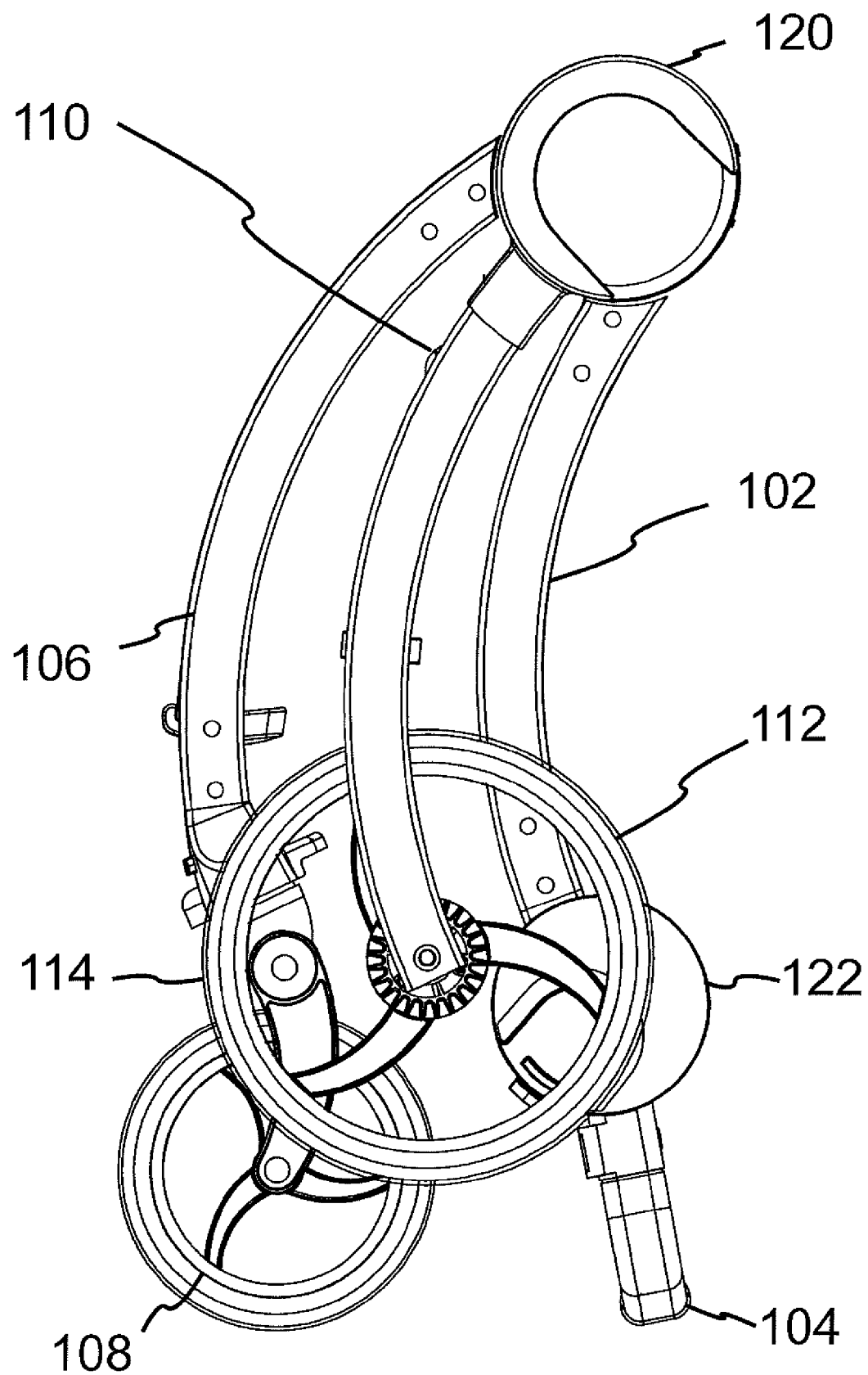
FIG. 6c is a side view the stroller chassis of FIG. 1a in a fully-folded configuration.

FIGS. 6a-6c are side views of the stroller chassis in: a rolling configuration; in a partially folded configuration; and, in a fully folded configuration, respectively. When the stroller chassis is partially folded, as is shown in FIG. 6b, the fold handle 124 is substantially vertical. A user may lift the stroller by the grab handle 124, which in turn causes the stroller to continue to collapse under the influence of gravity.

Figure 7A:
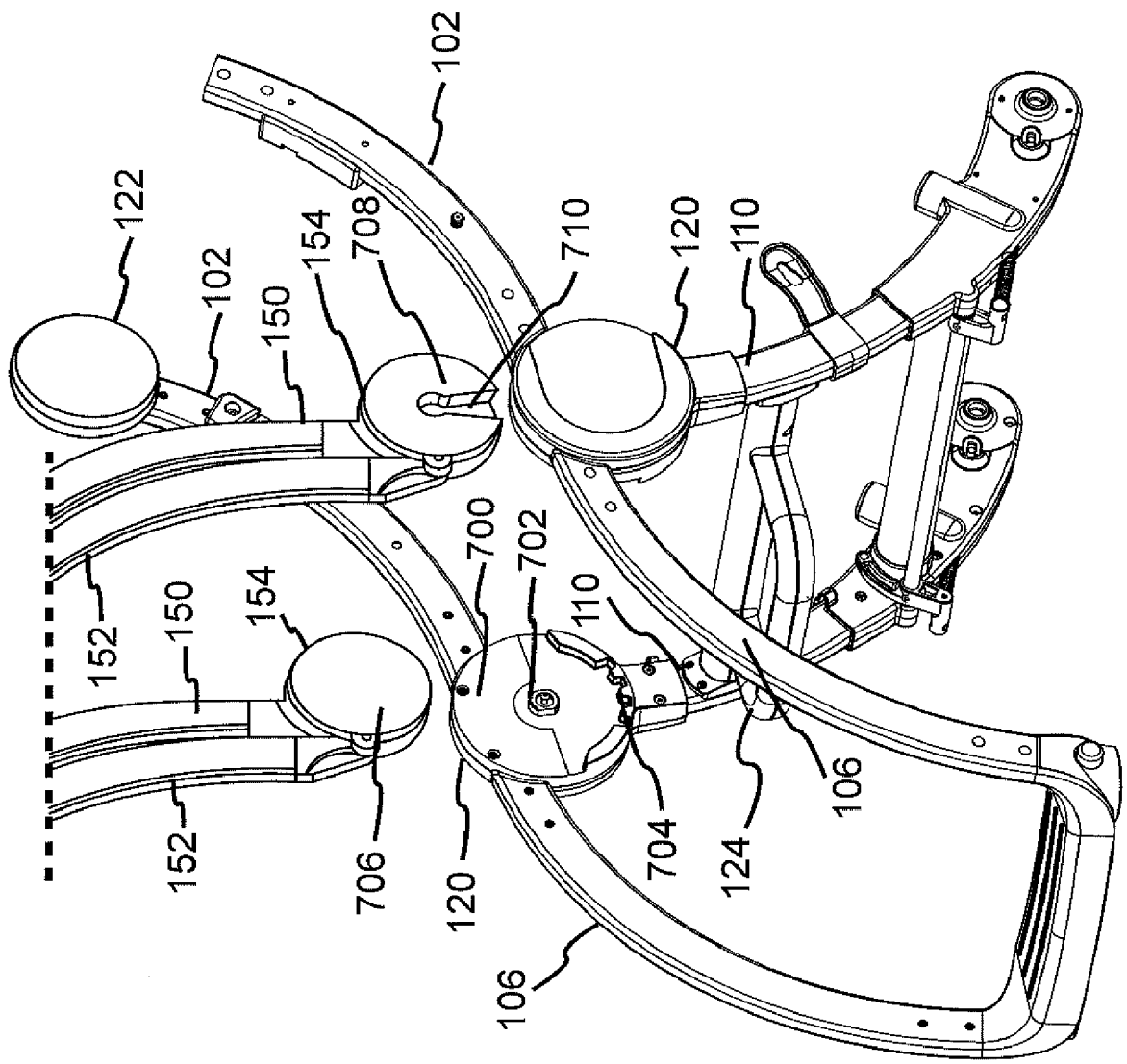
FIG. 7a shows the seat mounting structure of the stroller of FIG. 1a adjacent to a detachable, foldable toddler seat assembly.

Referring now to FIG. 7a, shown is an enlarged partial view of the structure for mounting the seat assembly to the stroller chassis. As shown in FIG. 7a, the inward facing surface 700 of hub 120 has a mounting structure 702, in the form of a "D-shaped" pin, which projects therefrom. Additionally, a rack 704 comprising a series of locking grooves is defined within a raised section of the inward facing surface 700, along a portion of the perimeter of hub 120 that is approximately centered about the middle frame member 110. The connector assembly 154 has a smooth inward facing surface 706, for the safety of the occupant of stroller 100. In addition, the outward facing surface 708 of the connector assembly 154 has a mounting structure 710, in the form of a substantially keyhole shaped groove, which is complementary to the mounting structure 702.

Figure 7B:
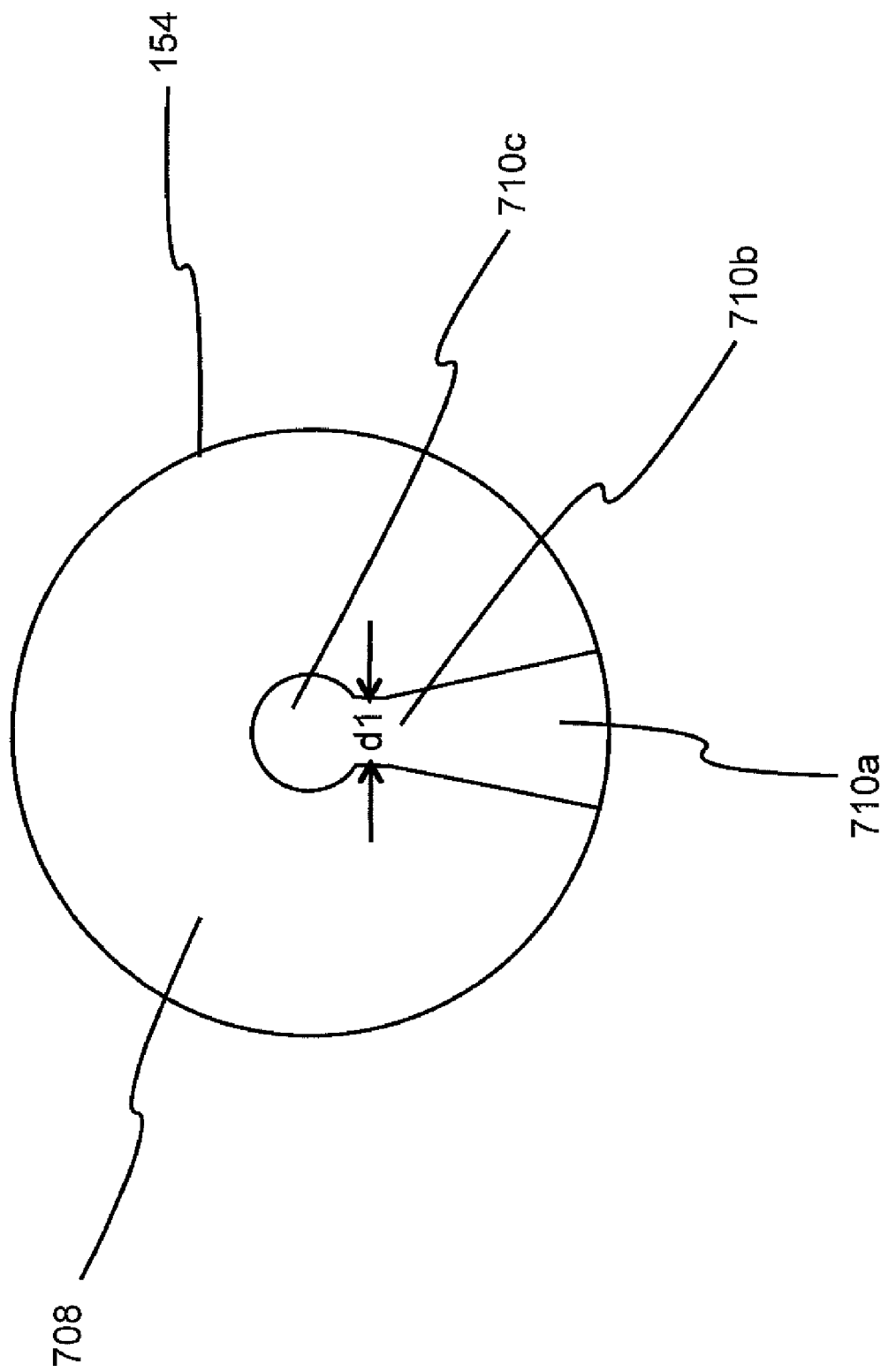
FIG. 7b shows a plan view of the mounting structure on the inner surface of the seat assembly coupling assembly.

Referring now to FIG. 7b, shown is a plan view of the mounting structure on the inner surface of the coupling assembly 154 of the seat assembly. In particular, the substantially keyhole shaped groove of the mounting structure 710 is defined by a recessed slot having a narrow slot portion 710b disposed between two relatively wider slot portions 710a and 710c. The width "d1" of the narrow portion 710b is substantially equal to the separation between the two mutually parallel sides of the shaft 714.

Figure 7C:
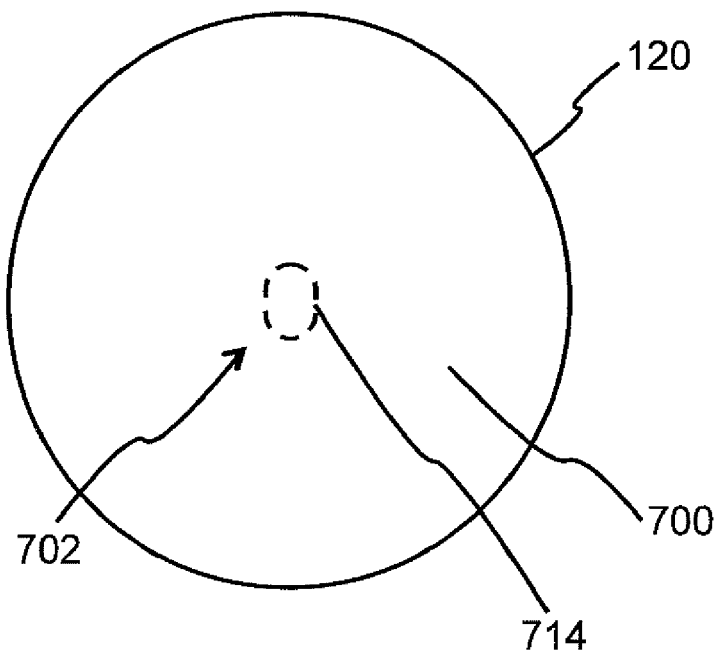

Referring now to FIG. 7c, shown is a side view of the mounting structure on the inward facing surface 700 of hub 120. The mounting structure 702 comprises a shaft 714 projecting from the inward facing surface 700. The shaft 714 has two mutually parallel flat sides, which are joined by opposite convexly curved sides. Optionally, the shaft 714 has a not illustrated flange at the distal end thereof, relative to the surface 700, projecting perpendicularly from the shaft 714.

Figures 7D, 7E:
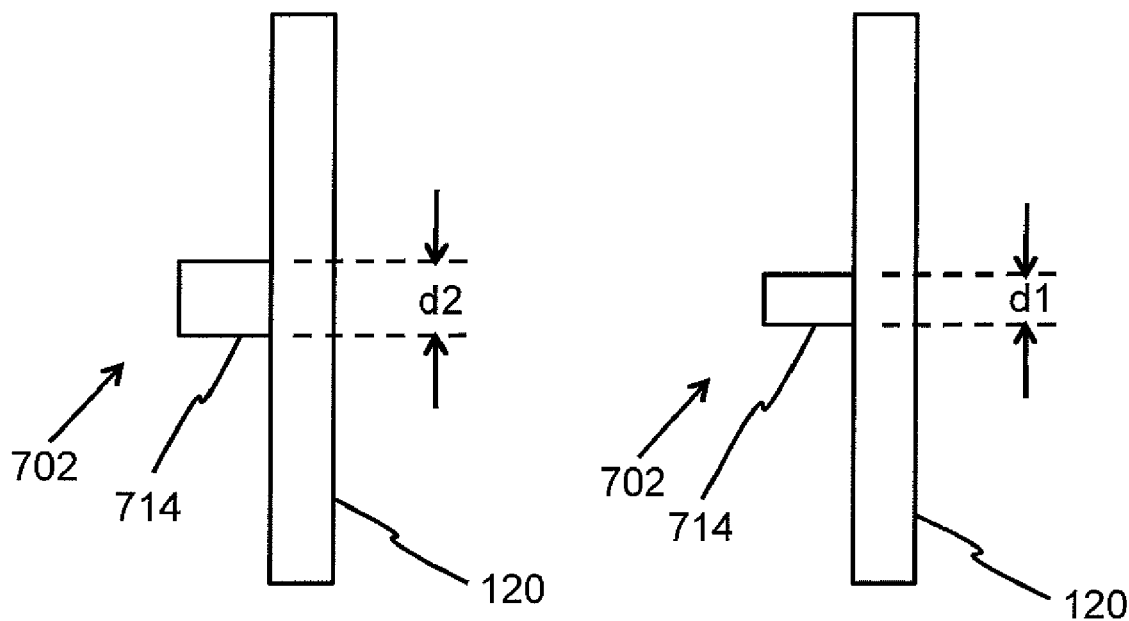

FIGS. 7d and 7e show a top view and a side view, respectively, of the mounting structure on the inward facing surface 700 of hub 120. The distance "d1" between the two mutually parallel sides of shaft 714 is smaller than the distance "d2" between opposite centers of the convexly curved sides joining the two mutually parallel sides of shaft 714.

When the seat assembly is to be mounted in the stroller chassis, the mounting structures 710 on either side of the seat assembly are aligned with the corresponding mounting structures 702 on the stroller chassis. The shaft 714 must be aligned so that the two mutually parallel sides thereof fit through the narrow portion 710b of the mounting structure 710. Once aligned properly, the shaft 714 of mounting structure 702 is urged into the wider portion 710c of the mounting structure 710, and the seat assembly is unfolded. Unfolding the seat assembly causes the coupling assembly 154 to rotate, such that the two mutually parallel sides of shaft 714 no longer line up with the narrow portion 710b of mounting structure 710. Thus, the unfolded seat assembly cannot lift off the stroller chassis. In particular, the seat assembly must be folded and rotated into an approximately vertical orientation in order to re-align the two mutually parallel sides of shaft 714 with the narrow portion 710b of mounting structure 710, after which the seat assembly may be lifted off the stroller chassis.

Figure 8A:
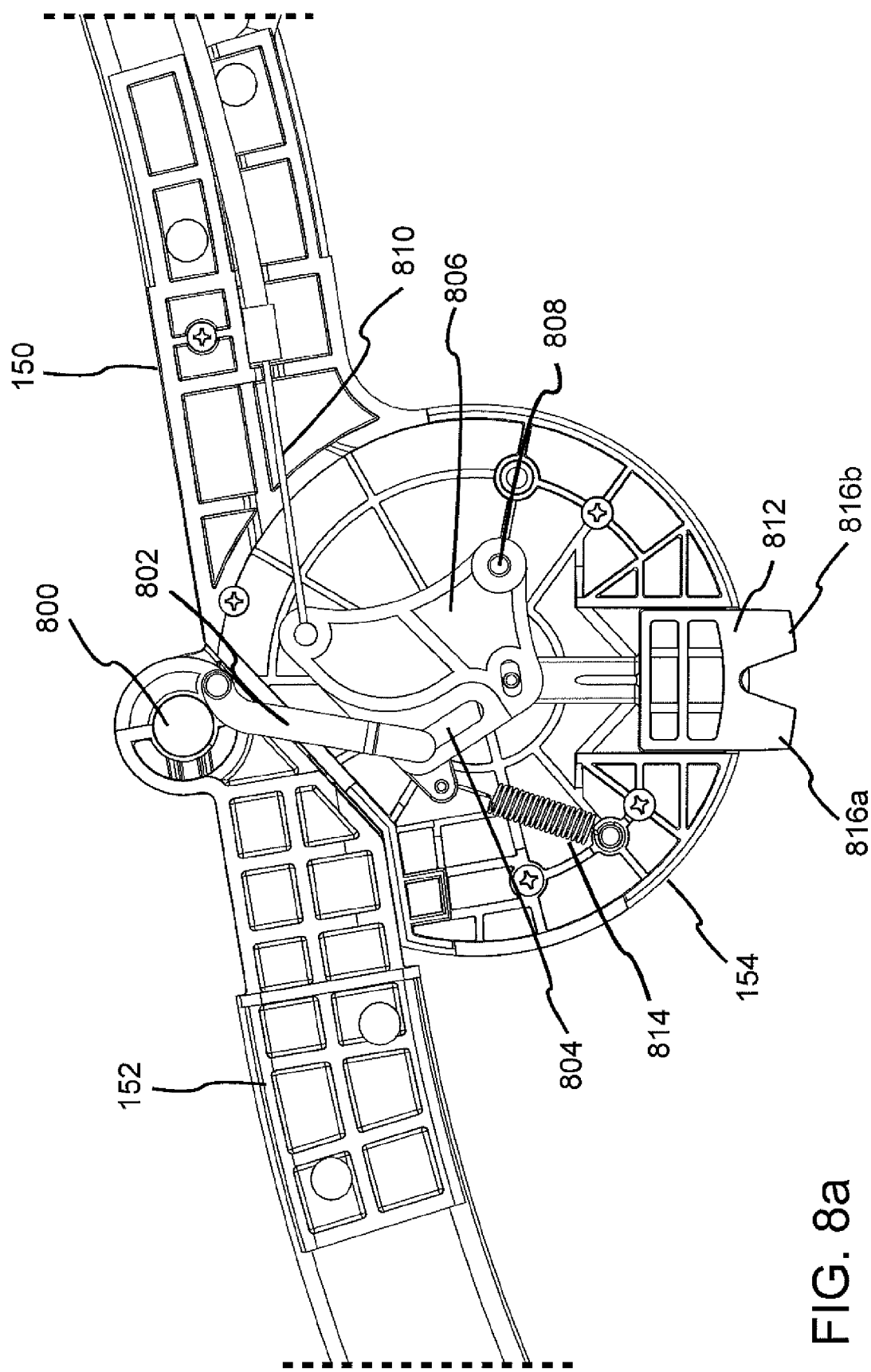
FIG. 8a shows the seat reclining mechanism of the stroller of FIG. 1a in a locked configuration.
Figure 8B:
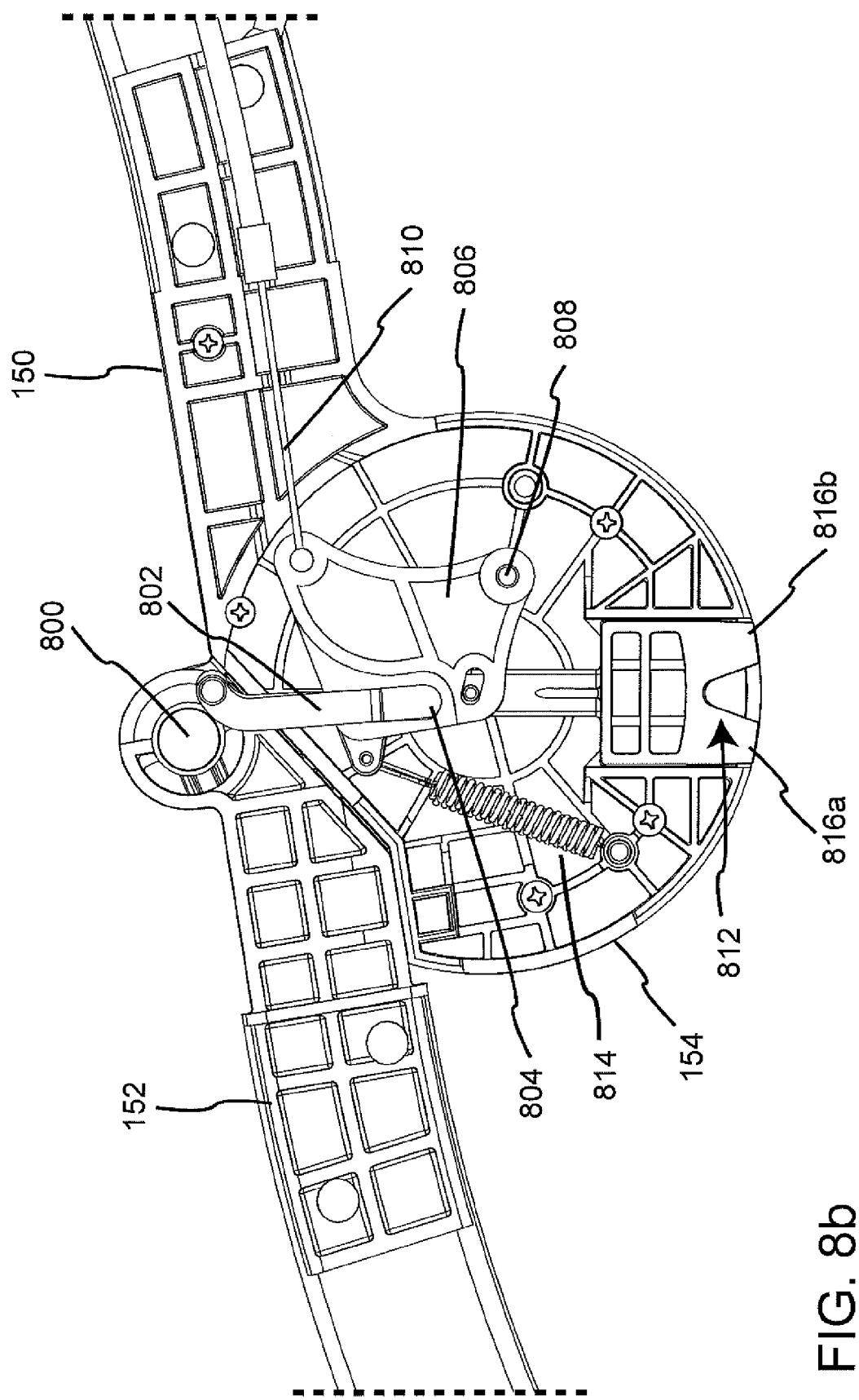
FIG. 8b shows the seat reclining mechanism of the stroller of FIG. 1a in an unlocked configuration.

Referring now to FIG. 8a and FIG. 8b, shown is an enlarged partial view of the seat inclination mechanism. The upper seat frame 150 and lower seat frame 152 are pivotally connected via pin 800 of the connector assembly 154. The rocker member 806 pivots about pin 808, and is connected to cable 810, pawl 812 and spring 814. The pawl 812 has two projections 816a and 816b for interlocking with two adjacent locking grooves of the rack 704. Spring 814 normally biases the projections 816a and 816b of pawl 812 into engagement with rack 704, such that inclination of the seat assembly relative to the stroller chassis is prevented.

To adjust inclination of the seat assembly relative to the stroller chassis a hand actuated mechanism, toddler seat recline adjust handle 156, is squeezed to pull on cable 810, thereby causing rocker member 806 to pivot about pin 808 and to move the projections 816a and 816b of pawl 812 out of contact with the locking grooves of rack 704. Once the projections 816a and 816b are completely clear of the rack, the toddler seat inclination may be adjusted. Once the adjustment is complete, release trigger latch 802 and spring 814 returns the rocker member 806 to its original position, such that projections 816a and 816b engage two different locking grooves of rack 704. The seat assembly is then locked in the new inclination position.

Referring now to FIGS. 9a-9c, shown is the toddler seat assembly in an inclined-forward position, a normal position, and a reclined position, respectively. FIGS. 9d-9f show the seat inclination mechanism in each of the inclined-forward position, the normal position, and the reclined position, respectively. In FIG. 9d the projections 816a and 816b of pawl 812 engage the two most rearward locking grooves of rack 704, thereby locking the seat assembly in the inclined-forward position. In FIG. 9e the projections 816a and 816b of pawl 812 engage the two central locking grooves of rack 704, thereby locking the seat assembly in the normal position. Finally, in FIG. 9f the projections 816a and 816b of pawl 812 engage the two most forward locking grooves of rack 704, thereby locking the seat assembly in the reclined position.

Referring now to FIG. 10, shown is an enlarged partial perspective view showing the upper hub 122 and an accessory having a mounting structure for coupling to the upper hub 122. In the instant example the accessory is shown in the form of a cup holder 1000. Optionally, other accessories may be substituted for the cup holder, such as for instance a shopping bag hook or a closable pouch for holding keys, change, a cell phone, glasses, etc. Optionally, a not illustrated adapter is provided in the form of a flat disk having on opposite sides thereof the same mounting structure that is shown on the hub 122 of FIG. 10. The adapter allows, by way of a specific and non-limiting example, a second cup holder 1000 to be mounted to the hub 122 on the opposite side of stroller 100. Optionally, the not illustrated adapted is used to mount a different accessory to the hub 122 on the opposite side of stroller 100.

Figure 11:
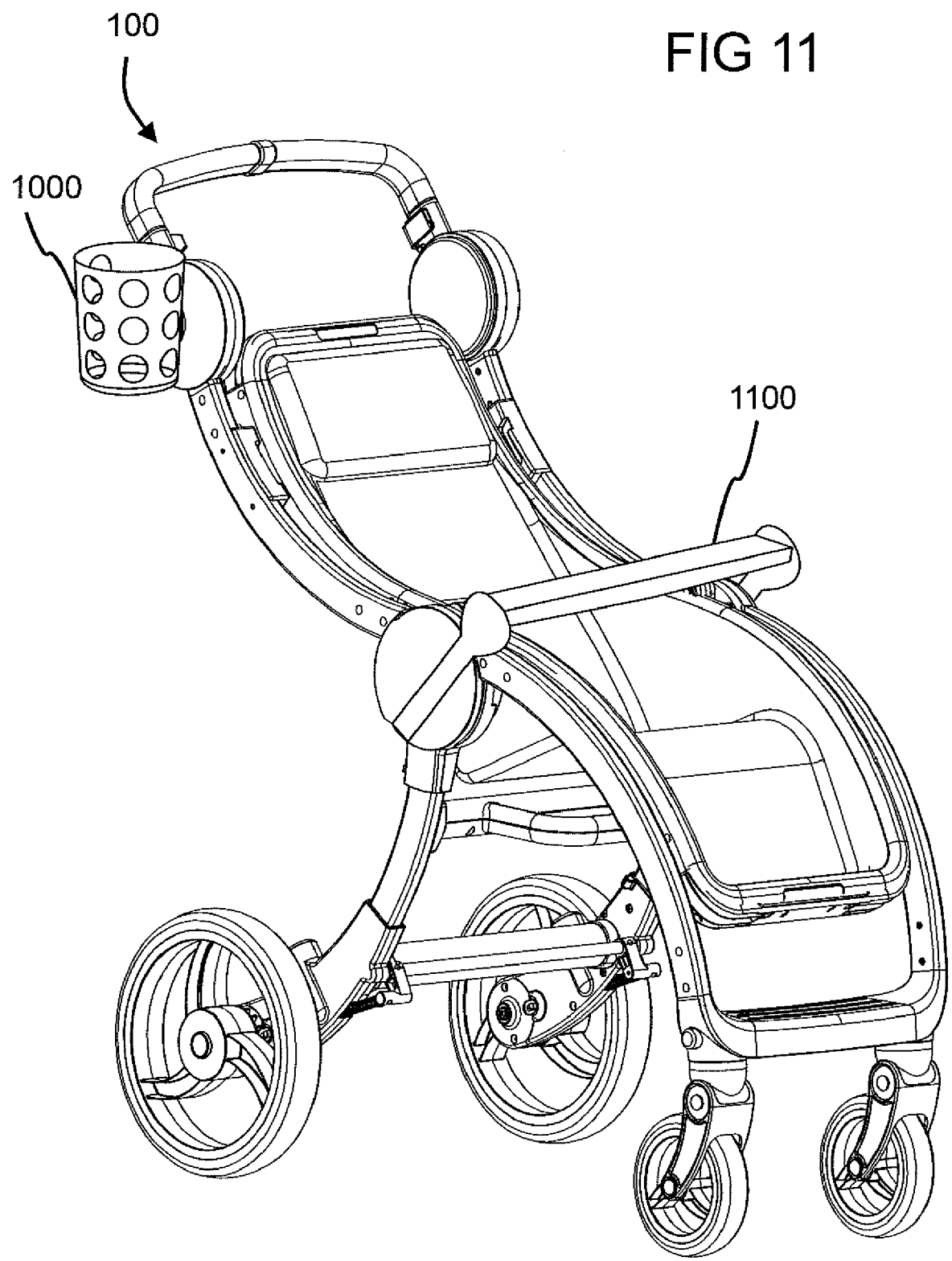

Referring now to FIG. 11, shown is a perspective view showing an accessory in the form of a tray 1100 mounted to stroller 100, and another accessory in the form of a cup holder 1000 mounted to one of the upper hubs 122. In particular, the tray 1000 has first and second mounting structures positioned for coupling to the central hubs 120 of stroller 100. The first and second mounting structures are substantially the same as described above for he upper hub.

Optionally, an infant car seat assembly is used for newborn infants (0-12 months) and can be installed onto the stroller chassis in lieu of the foldable toddler seat that is shown in FIG. 1b. In particular, the infant car seat is mountable in both a forward and a rearward facing position, but is not adjustable for different recline positions. The car seat must be removed from the stroller chassis in order to fold the stroller. This would typically occur when travelling by car where the infant car seat would be removed from the stroller and installed into the vehicle while the stroller chassis would be stored in the trunk. Further optionally, a bassinette is used for newborn infants (0-8 months) and can be installed onto the stroller chassis in lieu of the toddler seat or the infant car seat. In particular, the bassinette is mountable in both a forward and a rearward facing position, but is not adjustable for different recline positions so that the surface on which the child lays remains horizontal at all times. The bassinette is foldable so that it can be folded along with the stroller chassis for compact storage and transport.

Numerous other embodiments may be envisaged without departing from the scope of the instant invention.

What is claimed is:

1. A stroller, comprising:
left and right front wheels;
left and right side laterally spaced-apart front frame members, each of the left and right side front frame members having a forward end portion and a rearward end portion, the forward end portion of the left side front frame member being coupled to the left front wheel and the forward end portion of the right side front frame member being coupled to the right front wheel;

left and right rear wheels;

left and right side laterally spaced-apart middle frame members, each of the left and right side middle frame members having a forward end portion and a rearward end portion, the rearward end portion of the left side middle frame member including a wheel mounting structure along an outer face thereof and along an inner face thereof opposite the outer face, the rearward end portion of the right side middle frame member including a wheel mounting structure along an outer face thereof and along a inner face thereof opposite the outer face, so that the left rear wheel is selectably mountable adjacent to either the outer face or the inner face of the left side middle frame member, and so that the right rear wheel is selectably mountable adjacent to either the outer face or the inner face of the right side middle frame member;

left and right side laterally spaced-apart upper frame members, each of the left and right side upper frame members having a forward end portion and a rearward end portion; and, left and right side laterally spaced apart hubs disposed between and interconnecting corresponding ones of the front, middle and upper frame members, the left and right side hubs having complementary halves of an interlocking mounting structure defined on outward facing surfaces thereof, wherein side-by-side coupling of two strollers is supported by interlocking one of the left and right side hubs of one of the two strollers with the other one of the left and right side hubs of the other one of the two strollers.

2. The stroller according to claim 1, wherein a lateral separation between the complementary halves of the interlocking mounting structure defined on the outward facing surfaces of the left and right side hubs defines a maximum frame width of the stroller.

3. The stroller according to claim 2, wherein a lateral separation between the left and right rear wheels is greater than the maximum frame width of the stroller when the left and right rear wheels are mounted adjacent to the outer faces of the left and right middle frame members, respectively, and wherein a lateral separation between the left and right rear wheels is less than the maximum frame width of the stroller when the left and right rear wheels are mounted adjacent to the inner faces of the left and right middle frame members, respectively.

4. The stroller according to claim 1, wherein the left and right rear wheels each comprise a quick release axle and wherein the wheel mounting structure on the inner and outer faces of the left and right middle frame members comprises an axle hole for receiving the quick release axle of a respective one of the left and right rear wheels.

5. The stroller according to claim 1, wherein the complementary halves of the interlocking mounting structure comprises a raised flange structure disposed on one of the left and right side hubs and a recessed slot structure disposed on the other one of the left and right side hubs.

6. The stroller according to claim 1, comprising left and right laterally spaced apart upper hubs disposed one each along an outer face of the left and right upper frame members, respectively, the left and right upper hubs having complementary halves of an interlocking mounting structure defined on outward facing surfaces thereof, wherein a second point of attachment between two coupled strollers is provided by engaging facing ones of the left and right upper hubs of the two coupled strollers.

7. The stroller according to claim 1, wherein the two strollers comprise at least one of a toddler seat frame, an infant car seat, and a bassinette.

8. The stroller according to claim 1, wherein each one of the rear wheels comprises a quick release axle, and wherein the middle frame member comprises an axle hole along each inner face thereof for receiving the quick release axles when in the coupled operating condition, and wherein the middle frame member comprises an axle hole along each outer face thereof for receiving the quick release axles when in the detached operating condition.

9. A stroller, comprising:

a front frame member assembly supporting a pair of laterally spaced apart front wheels;

a middle frame member assembly supporting a pair of laterally spaced apart rear wheels, the middle frame member assembly configured so that the rear wheels are detachably mountable one each adjacent to outer faces of the middle frame member assembly for operation in a detached operating condition between a first and a second stroller, and so that the rear wheels are detachably mountable one each adjacent to inner faces of the middle frame member assembly for operation in a coupled operating condition between a first and a second stroller;

an upper frame member assembly with a push handle portion;

first and second laterally spaced apart hubs disposed between and interconnecting the front frame member assembly, the middle frame member assembly, and the upper frame member assembly, the first hub having a first mounting structure defined on an outward facing surface thereof and the second hub having a second mounting structure defined on an outward facing surface thereof, the second mounting structure different than the first mounting structure, the first and second mounting structures defining complementary halves of a first interlocking coupling mechanism;

wherein the first mounting structure disposed on the outward facing surface of the first hub of the first stroller is aligned with and engages the second mounting structure on the outward facing surface of the second hub of the second stroller, for detachably securing the first stroller to the second stroller in a side-by-side fashion.

10. The stroller of claim 9, comprising third and fourth laterally spaced apart hubs disposed on the upper frame member assembly, the third hub having a third mounting structure defined on an outward facing surface thereof and the fourth hub having a fourth mounting structure defined on an outward facing surface thereof, the fourth mounting structure different than the third mounting structure, the third and fourth mounting structures defining complementary halves of a second interlocking coupling mechanism, wherein the third mounting structure on the outward facing surface of the third hub of the first stroller is aligned with and engages the fourth mounting structure on the outward facing surface of the fourth hub of the second stroller when the first stroller and the second stroller are detachably secured in the side-by-side fashion.

11. The stroller according to claim 10, wherein one of the first and second mounting structures comprises a raised flange and the other one of the first and second mounting structures comprises a recessed slot, and wherein one of the third and fourth mounting structures comprises a raised flange and the other one of the third and fourth mounting structures comprises a recessed slot.

12. The stroller according to claim 9, wherein a lateral separation between the first mounting structure that is defined on the outward facing surface the first hub and the second mounting structure that is defined on the outward facing surface of the second hub defines a maximum frame width of the stroller.

13. The stroller according to claim 12, wherein a lateral separation between the rear wheels is greater than the maximum frame width of the stroller when the rear wheels are detachably mounted one each adjacent to the outer faces of the middle frame member assembly, and wherein a lateral separation between the rear wheels is less than the maximum frame width of the stroller when the rear wheels are detachably mounted one each adjacent to the inner faces of the middle frame member assembly.

14. A stroller, comprising:
a front frame member assembly supporting a pair of laterally spaced apart front wheels;
a middle frame member assembly supporting a pair of laterally spaced apart rear wheels, the middle frame member assembly including first and second wheel mounting structures disposed along outer faces thereof on opposite sides of the stroller and including third and fourth wheel mounting structures disposed along inner faces thereof on opposite sides of the stroller, so that the pair of rear wheels is selectably mountable adjacent to either the outer faces or the inner faces of the middle frame member, a lateral separation between the pair of rear wheels being greater when the pair of rear wheels is mounted adjacent to the outer faces of the middle frame member relative to when the pair of rear wheels is mounted adjacent to the inner faces of the middle frame member;
an upper frame member assembly extending to a push handle end;
a first hub disposed on a first side of the stroller and a second hub disposed on a second side of the stroller and opposite the first hub, the first and second hubs disposed between and interconnecting the front frame member assembly, the middle frame member assembly, and the upper frame member assembly, the first hub having a raised flange portion of a first interlocking coupling mechanism defined on an outward facing surface thereof and the second hub having a recessed slot portion of the first interlocking coupling mechanism defined on an outward facing surface thereof;
a third hub disposed on the first side of the stroller and proximate the push handle end of the upper frame member assembly and a fourth hub disposed on the second side of the stroller and proximate the push handle end of the upper frame member assembly, the third hub having one of a raised flange portion and a recessed slot portion of a second interlocking coupling mechanism defined on an outward facing surface thereof and the fourth hub having the other one of the raised flange portion and the recessed slot portion of the second interlocking coupling mechanism defined on an outward facing surface thereof;
wherein for coupling the stroller with a second stroller, the raised flange portion of the first hub on the first side of the stroller slidingly engages the recessed slot portion of the second hub on the second side of the second stroller, and the one of the raised flange portion and the recessed slot portion of the third hub on the first side of the stroller sliding engages the other one of the raised flange portion and the recessed slot portion on the fourth hub on the second side of the second stroller.

15. The stroller according to claim 14, wherein each one of the rear wheels comprises a quick release axle.

16. The stroller according to claim 15, wherein the first and second wheel mounting structures each comprise an axle hole for receiving the quick release axle of one rear wheel of the pair of rear wheels, so as to support a detached operating mode of the stroller in which the pair of rear wheels is mounted adjacent to the outside faces of the middle frame member assembly.

17. The stroller according to claim 15, wherein the third and fourth wheel mounting structures each comprise an axle hole for receiving the quick release axle of one rear wheel of the pair of rear wheels, so as to support a coupled operating mode of the stroller in which the pair of rear wheels is mounted adjacent to the inside faces of the middle frame member assembly.

18. A method comprising:
providing a first stroller and a second stroller each comprising a frame supported by a pair of laterally spaced apart front wheels and a pair of laterally spaced apart rear wheels, the frame of each stroller comprising first and second mounting structures on a first side thereof and comprising third and fourth mounting structures on a second side thereof, the second side opposite the first side of the stroller, a maximum frame width being defined between outward facing surfaces of the first and third mounting structures, each one of the pair of laterally spaced apart rear wheels being detachably mounted adjacent to an outer face of a rear-wheel support member on opposite sides of the frame, such that a lateral separation between the rear wheels is greater than the maximum frame width;
detaching each rear wheel from a respective rear-wheel support member on each one of the first stroller and the second stroller;
detachably mounting each rear wheel to an inner face of a respective rear-wheel support member on opposite sides of the frame of each one of the first stroller and the second stroller, such that for each one of the first stroller and the second stroller the rear wheels are laterally spaced apart by an amount that is less than the maximum frame width of the respective stroller; and,
detachably engaging the first and second mounting structures on the first side of the frame of the first stroller with the third and fourth mounting structures on the second side of the frame of the second stroller, respectively, so as to couple the first stroller with the second stroller in a side-by-side fashion with two points of attachment,
wherein a maximum overall width of the first and second stroller, when coupled together in the side-by-side fashion, does not exceed the sum of the maximum frame width of the first stroller and the maximum frame width of the second stroller.

19. The method according to claim 18, wherein detaching each rear wheel from a respective rear-wheel support member comprises activating a quick release mechanism of each rear wheel.

20. The method according to claim 18, wherein each rear wheel comprises a quick release axle, and wherein detachably mounting each rear wheel to an inner face of a respective rear-wheel support member comprises engaging the quick release axle of each rear wheel within an axle hole that is defined along the inner face of the respective rear-wheel support member.

* * * * *